(12) United States Patent
Louviere et al.

(10) Patent No.: US 6,934,748 B1
(45) Date of Patent: Aug. 23, 2005

(54) AUTOMATED ON-LINE EXPERIMENTATION TO MEASURE USERS BEHAVIOR TO TREATMENT FOR A SET OF CONTENT ELEMENTS

(75) Inventors: Jordan J. Louviere, Northbridge (AU); Hikaru Phillips, Bronte (AU); Jason P. Bennett, Carlingford (AU)

(73) Assignee: Memetrics Holdings PTY Limited, Balmain (AU)

( * ) Notice: Subject to any disclaimer, the term of this patent is extended or adjusted under 35 U.S.C. 154(b) by 608 days.

(21) Appl. No.: 09/648,429

(22) Filed: Aug. 25, 2000

(30) Foreign Application Priority Data

Aug. 26, 1999 (AU) .............................................. PQ2468

(51) Int. Cl.[7] ............................................. G06F 15/173
(52) U.S. Cl. ...................................... 709/224; 705/10
(58) Field of Search ............................... 709/201, 203, 709/217–219, 223–224; 345/962; 705/10, 52

(56) References Cited

U.S. PATENT DOCUMENTS

| | | | | |
|---|---|---|---|---|
| 5,124,911 A | * | 6/1992 | Sack ............................ | 705/10 |
| 5,809,242 A | | 9/1998 | Shaw et al. ............. | 395/200.47 |
| 5,848,396 A | * | 12/1998 | Gerace ......................... | 705/10 |
| 5,872,850 A | | 2/1999 | Klein et al. .................... | 380/49 |
| 5,918,014 A | * | 6/1999 | Robinson ..................... | 709/219 |
| 5,968,125 A | | 10/1999 | Garrick et al. .............. | 709/224 |
| 6,020,883 A | * | 2/2000 | Herz et al. ................... | 345/327 |
| 6,029,195 A | * | 2/2000 | Herz .......................... | 709/219 |
| 6,430,539 B1 | * | 8/2002 | Lazarus et al. ................ | 705/10 |
| 6,460,036 B1 | * | 10/2002 | Herz ............................ | 707/10 |

FOREIGN PATENT DOCUMENTS

WO WO 01/14952 A2 * 3/2001 ............ G06F/15/16

OTHER PUBLICATIONS

Integrating conjoint and functional measurement with discrete choice theory: An Experimental Design Approach, Louviere, Advances in Consumer Research vol. 10, 1983, p. 151–156.*
A comparison of Still, Animated or Non–illustrated On–Line Help with written or spoken instructions in a graphical user interface, Harrison, S., Univ. of Winsconsin, ACM, 1995, p. 1–13.*
Attribute importance weights in Conjoint Analysis: Bias and Precision, Mishra, S., Umesh, U.N., Stem, D.E., Washington State Univ., Advances in Consumer Research vol. 16, 1989, p. 605–611.*
Experimental Design and Analysis in Software Engineering, Part 3: Types of Experimental Design, Pfleeger, S.H., ACM SIGSOFT, Software Engineering Notes, vol. 20, No. 2, Apr. 1995, p. 14–16.*
Commerical Use of Conjoint Analysis in Europe: Results and Critical Reflections, Wittink, E.R., Vriens, M., Burhenne, W., Sawtooth Software, 1996, p. 1–17.*

(Continued)

*Primary Examiner*—B. Prieto
(74) *Attorney, Agent, or Firm*—Ganz Law, PC; Bradley M. Ganz

(57) ABSTRACT

An automated system for experimentation includes an experiment engine which can define an experiment relating to various treatments for a set of content elements. The experiment engine conducts the experiment over a data network. An observation module collects observation data relating to user behavior for each treatment. A scripting/scheduling engine coordinates the operation of the experiment engine and the observation module.

43 Claims, 11 Drawing Sheets

OTHER PUBLICATIONS

Framework for Data Collection in Manning Affordability Initiatice, Measures of Performance and Effectiveness, Experimental Planning and Analysis, MacMillan, J. & Bracken, K., Aptima Inc., Aug. 1998, p. 1–20.*

Judgement and Decision Making, Mellers, B.A., Schwarts, A., Cooke, D.J., Annu. Rev. Psychol., Annual Reviews Inc., 1998, p. 447–477.*

Video Browsing User Interface Designs: Effectiveness in Information Seeking Task, Tse, T., Vegh, S., May 1998, p. 1–20.*

Navigational Cues on User Interface Design to Produce Better Information Seeking on the World Wide Web, Rumpradit, C. & Donnell, M., Washington Univ., IEEE, 32th Annual Hawai International Conference on Systems Science, Vo. 5, Jan. 1999, p. 1–10.*

Model and Representation: The Effect of Visual Feedback on Human Performance in Color Picker Interface, Douglas, S.A. & Kirkpatrick, ACM Transaction on Graphics, ACM 0730–0301/99/0200–0096, Apr. 1996, p. 96–127.*

Doing Business in the Internet: Opportunities and Pitfalls, Will you use Animation on your Web pages, Experiments of Animation Effects and Implications for Web User Interface Design and Online Advertising, Romm, C. & Sudweeks, F., Springer–Verlag, 1999.*

Assignment#4, Michigan State Univ. Advertising and Public Relations Research, Fall 1988, p. 1.*

Experimenting in the World Wide Web, Reips, U.D., Society for Computers in Psychology Conf, Chicago, Oct. 1996, p. 1–22.*

Introduction to Attribute based State Choice Methods, Adamowicz, W., Louviere, J., NOAA, Jan. 1998, 1–44.*

Impact of Navigational Models on Task Completion in Web based Information Systems, AECT Presentation to Research and Theory Div., School of Eduction Indiana Univ., Bloomington, 1999.*

Testing Web Site Design and Promotional Content, Dreze, X.; Zufryden, F., Aug. 1998, pp. 1–43.*

Moving Usability Testing Onto the Web, Martin Svensson, Arnold Johansson, Anna–Lena Ereback, Kristina Höök, Jussi Karlgren, 1998, pp. 1–8.*

Dreze, et al.; "Testing Web Site Design and Promotional Content"; *Journal of Advertising Research*; Jan./Feb. 1997; vol. 37, No. 1; pp. 77–91.

Dreze, et al.;; "A Web–Based Methodology for Product Design Evaluation and Optimisation"; *Journal of the Operational Research Society*; Oct. 1998; vol. 49, No. 10; pp. 1034–1048.

* cited by examiner

AUTOMATED ON-LINE EXPERIMENTATION TO MEASURE USERS BEHAVIOR TO TREATMENT FOR A SET OF CONTENT ELEMENTS

TECHNICAL FIELD OF THE INVENTION

The present invention relates generally to the field of experimentation and, more particularly, to on-line experimentation.

BACKGROUND OF THE INVENTION

Experimentation is useful for testing new or different ideas, and can lead to better products, methods, techniques, etc. During experimentation, a number of alternate ideas or approaches may be provided to various test subjects and the results observed. For example, experiments can be set-up for testing various structures or arrangements for content: (e.g., data or information which can be presented to a person in some form or fashion). To maximize the benefit of experimentation, it is desirable to have a suitable population of test subjects. In general, the greater the number of alternate ideas, the greater the number of test subjects required in order to provide or obtain accurate test results for an experiment. As can be imagined, for experiments involving many alternate ideas, the administration of the experiments can be quite burdensome, especially if the administrative tasks (e.g., distributing embodiments for alternate ideas, collecting information observed during the experiments, and analyzing the collected information) are performed manually. Previously developed techniques for experimentation have suffered from these and other problems.

SUMMARY OF THE INVENTION

According to one embodiment of the present invention, an automated system for experimentation includes an experiment engine which can define an experiment relating to various treatments for a set of content elements. The experiment engine conducts the experiment over a data network. An observation module collects observation data relating to user behavior for each treatment. A scripting/scheduling engine coordinates the operation of the experiment engine and the observation module.

According to another embodiment of the present invention, an automated method for experimentation includes: defining an experiment relating to various treatments for a set of content elements; conducting the experiment over a data network; collecting over the data network observation data relating to user behavior for each treatment; and generating at least one script to coordinate defining an experiment, conducting the experiment, and collecting observation data.

According to yet another embodiment of the present invention, an automated system for experimentation includes a content system which stores content. The content includes a set of content elements. A communication management system, in communication with the content system, may define an experiment relating to various treatments for the set of content elements. The communication management system conducts the experiment over a data network, collects over the data network observation data relating to user behavior for each treatment, and generates at least one script for coordinating the operation of the content system and the communication management system.

According to still another embodiment of the present invention, an automated system for experimentation includes an experiment engine which defines an experiment relating to various treatments for a set of content elements. The experiment engine allocates each treatment to a separate control group of users over a data network. An observation module collects observation data relating to user behavior for each treatment. A scripting/scheduling engine coordinates the operation of the experiment engine and the observation module.

According to still yet another embodiment of the present invention, an automated method for experimentation includes: defining an experiment relating to various treatments for a set of content elements; allocating each treatment to a separate control group of users over a data network; collecting over the data network observation data relating to user behavior for each treatment; and generating at least one script to coordinate defining an experiment, conducting the experiment, and collecting observation data.

A technical advantage of the present invention includes providing an automated system and method which performs on-line experimentation. The system and method break down any given content to its elemental components, create one or more content structures or treatments for presenting the content to users, design experiments to test the behavior or reaction of users to each treatment, deliver the treatments to one or more users in controlled experiments, and collect information or data on the outcomes/objectives for each experiment.

An automated system and method, in accordance with embodiments of the present invention, define and conduct experiments for determining user reactions to various types and formats of content, and modify the type/format of content in response to the results of such experimentation. The system and method may use experimental designs, for example, in the context of electronic commerce, to systematically determine the relationships between content type/format and various desired objectives or outcomes. The system and method target specific objectives/outcomes in relation to experimentally designed content type/format to examine the relationship therebetween. Thus, the present invention relates trackable objectives/outcomes to content optimization.

A system and method, in accordance with embodiments of the present invention, may implement a web-based software solution to segment and analyze website traffic. This software solution may directly embed advanced discrete multivariate and related dependent variable technologies including, for example, any data mining implementations that use neural net, regression, classification and regression tools or related technologies.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

Figure 1:
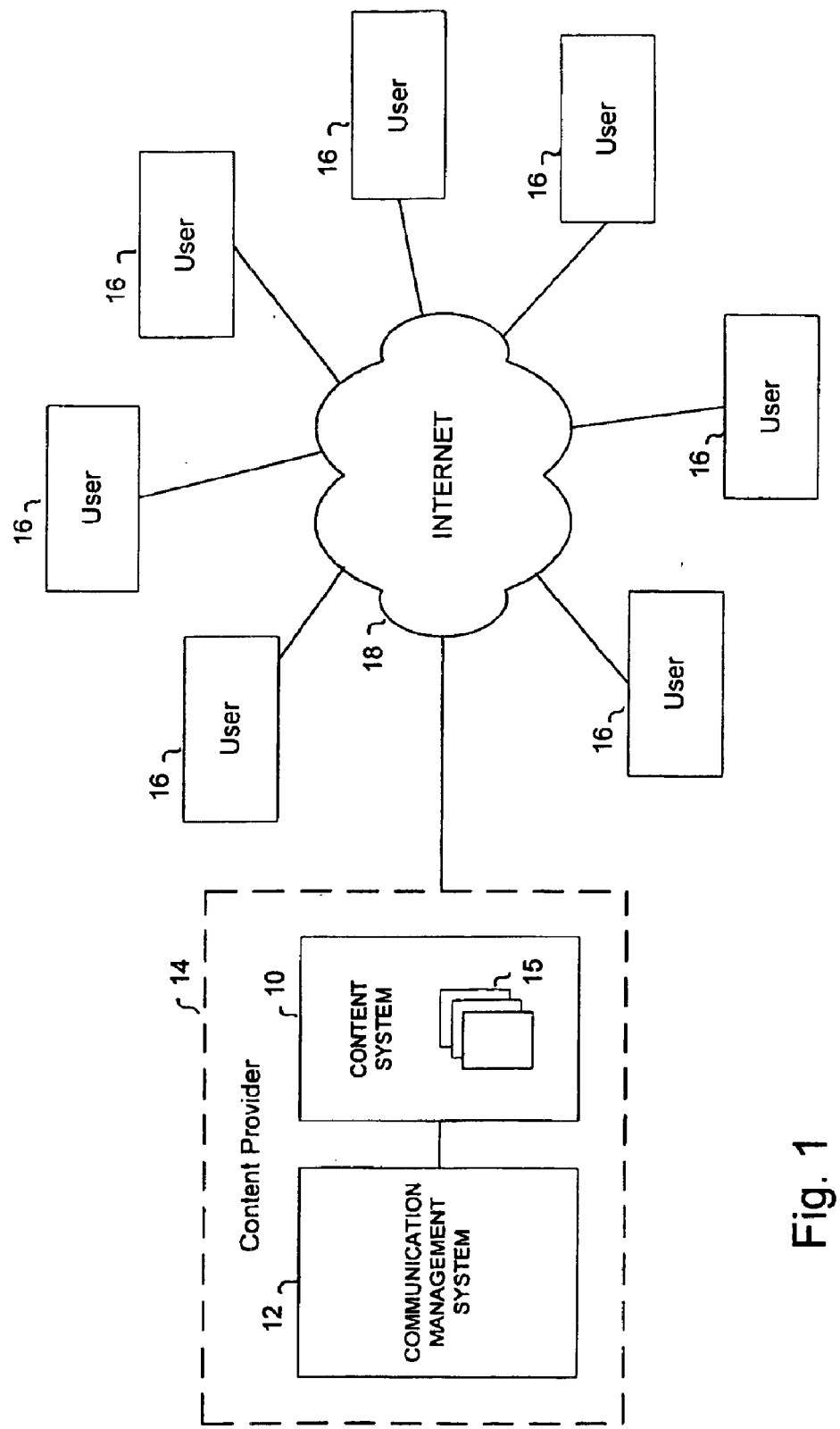
FIG. 1 illustrates an environment in which a content system and a communication management system, according to an embodiment of the present invention, may operate.

The preferred embodiments for the present invention and their advantages are best understood by referring to FIGS. 1–11 of the drawings. Like numerals are used for like and corresponding parts of the various drawings.

Turning first to the nomenclature of the specification, the detailed description which follows is represented largely in terms of processes and symbolic representations of operations performed by conventional computer components, such as a central processing unit (CPU) or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures :impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an exemplifying implementation of the present invention and are not related, or limited, to any, particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Environment for Content Management

FIG. 1 illustrates an environment in which a content system 10 and a communication management system 12, according to an embodiment of the present: invention, may operate. In general, content system 10 and communication management system 12 cooperate to manage the delivery of content 15 to one or more users 16, as described in more detail herein. Content system 10 and communication management system 12 may each comprise a suitable combination of software and/or hardware for performing the functionality described herein.

It is contemplated that systems 10 and 12 may be maintained, managed, and/or operated by a provider 14 of content 15 to users 16. Such content provider 14 can be an entity which operates or maintains a portal or any other website through which content can be delivered. For example, content provider 14 can be on-line retailer of merchandise, an on-line news service, and the like. Each user 16 may "visit" the website operated by content: provider 14, for example, to view information, and perhaps, to complete a commercial transaction. Users 16 can include individuals, organizations, or their agents, which can be human or virtual.

Content system 10 serves as a repository for content 15. Content system 10 can be implemented at least in part with any system suitable for storing content. For example, content system 10 may include a SPECTRA server system from Allaire Corporation or a STORY server system from Vignette Corporation. In general, content 15 can be any data or information that is presentable (visually, audibly, or otherwise) to users 16. Thus, content 15 can include written text, images, graphics, animation, video, music, voice, and the like, or any combination thereof. For example, if content provider 14 is a on-line retailer of merchandise, content 15 may include images of various goods offered by the retailer, textual descriptions and price quotes for each good, detailed information about on-line ordering, graphics or animation to capture a user's attention, etc. Similarly, if content provider 14 is a web portal, content 15 may include textual listings or directories for various areas of interest, icons (interactive or non-interactive), images of products, hyperlinks to other websites, banner advertisements, etc. If content provider 14 is an on-line news service, content 15 may include textual information for various news stories, photographs and/or illustrations to accompany at least some of the stories, video and/or audio clips for late-breaking stories, listings for weather reports in various geographic areas, maps for these geographic areas, etc. Content 15 from content system 10 may be provided for any of a variety of purposes or applications, such as, for example, product development, public relations, customer service, advertising, electronic commerce, and the like.

Content 15, which can be stored in digital form, may be broken down or reduced to a set of elemental components. An elemental component can be, for example, a text file, an image file, an audio file, a video file, etc. These elemental components may be combined and/or formatted in a number of different ways or structures for presenting content 15 to users 16.

Each separate combination and/or formatting of content 15 constitutes a content structure or treatment. A content structure can be, for example, a particular implementation of a web page at a given moment. More specifically, at the given instance of time, the web page may contain particular text, icons, images, and/or video located at particular positions on the screen, particular visual background shading or color, particular borders for dividing up the screen, particular audio (music or speech), and the like.

The way content 15 is structured may affect or impact a user's behavior or reaction to the content. For example, a user 16 may react positively to a web page having a neutral background color (e.g., gray), and negatively to a web page having a bolder background color (e.g., fuchsia). A user's reaction may be tied to a particular desired objective or outcome. An outcome generally can relate to any behavior by a user at a website that content provider 14 would like to influence or manage. This behavior can include "click-throughs" of the website by a user, time spent by the user on requests for information, number and nature of pages viewed by the user, length of time spent at the website by the user, repeat sessions, purchases of goods/services offered on the websites, submission of information, registration, login, personalization, reading, or other related behaviors. For example, for an on-line retailer of merchandise, one desired objective/outcome can be the completion of a transaction or sale. For a web portal, a desired objective/outcome can be increased "stickiness" (i.e., the amount of time that a user 16 spends at the website, and the number of repeat visits to the website). As such, structured content may be meaningful in the context of its relationship to a desired objective/outcome.

Because various objectives/outcomes may be important to content provider 14, communication management system 12 is provided to manage the content 15 (and structures for same) which is ultimately delivered or presented to users 16, thereby influencing the behavior of users 16 in such a way as to achieve the desired objectives/outcomes. Communication management system 12 supplements the functionality of the existing content system 10 as described herein. In one embodiment, communication management system 12 can be implemented as a software-based or software-driven product which can be bundled or integrated with an existing content system of content provider 14. Communication management system 12 enhances any application of structured content by identifying the linkage or connection between content 15 and desired objectives, and providing feedback in relation to what structured content should be delivered to users 16 in the future.

To accomplish this, communication management system 12 may cooperate with content system 10 to break down any given content 15 to its elemental components, create one or more content structures or treatments for presenting the content to users, design experiments to test the behavior or reaction of users to each treatment, deliver the treatments over a suitable data network to one or more users in controlled experiments, collect information or data on the outcomes/objectives for each experiment, generate predictive models using the collected information, and modify or customize the structure of content 15 using the predictive models.

To optimize the effectiveness of the structured content, content provider 14 determines its objectives for the associated portal or website in relation to the behavior of users 16 and decides what elements of the communication are relevant or have potential to influence that behavior. For example, content provider 14 may want to optimize its communication to achieve better match between relevant content 15 and user preferences in order to increase return visits of users 16 in general to the portal or website. Content system 10 and communication management system 12 facilitate the identification and specification of the relevant elemental components, the specification of various alternative structures for content (e.g., messages and means of communication), and assign control variables and values to these structures for implementation. As such, content system 10 and communication management system 12 may implement a systematic approach for the design and development of interactive communication to optimize, enhance, or otherwise improve, for example, product development, public relations, customer service, advertising effectiveness, electronic commerce, or any other application which can benefit from real-time customization of content 15. Content system 10 and communication management system 12 may thus collectively implement a system for managing the delivery of content 15 to users 16.

Content system 10 and communication management system 12 may be integrated with or connected to a suitable data network or digital system—i.e., a system augmented by digital services. As used herein, the terms "connected," "coupled," or any variant thereof, means any connection or coupling, either direct or indirect, between two or more elements; such connection or coupling can be physical or logical. In general, a data network or digital system can provide or support an interactive channel by which users 16 may interact with content system 10 and communication management system 12. Examples of such data networks or digital systems include, telephone call centers, cellular networks, pager networks, automated teller machine (ATM) networks, instant messaging systems, local area networks (LANs), wide area networks MAW, Intranets, Extranets, interactive television services or, as depicted, Internet 18.

Internet 18 is an interconnection of computer "clients" and "servers" located throughout the world and exchanging information according to Transmission Control Protocol/Internet Protocol (TCP/IP), Internetwork Packet eXchange/Sequence Packet eXchange (IPX/SPX), AppleTalk, or other suitable protocol. Internet 18 supports the distributed application known as the "World Wide Web." Web servers maintain websites, each comprising one or more web pages at which information is made available for viewing. Each website or web page can be identified by a respective uniform resource locator (URL) and may be supported by documents formatted in any suitable language, such as, for example, hypertext markup language (HTML), extended markup language (XML), or standard generalized markup language (SGML). Clients may locally execute a "web browser" program. A web browser is a computer program that allows the exchange of information with the World Wide Web. Any of a variety of web browsers are available, such as NETSCAPE NAVIGATOR from Netscape Communications Corp., INTERNET EXPLORER from Microsoft Corporation, and others that allow convenient access and navigation of the Internet 18. Information may be communicated from a web server to a client using a suitable protocol, such as, for example, HyperText Transfer Protocol (HTTP) or File Transfer Protocol (FTP). Internet 18 allows interactive communication between users 16 and the content and communication management systems 10 and 12.

In one embodiment, content system 10 and communication management system 12 enable content provider 14 to automatically customized content 15 delivered to users 16 via a data network such as the Internet 18. Due to the widespread popularity of the Internet 18, content system 10 and communication management system 12 have the capability to reach a relatively large number of users 16, thereby allowing significant segmentation of users and experimentation in a large pool. The remainder of this description focuses primarily on a system and method in the context of the Internet 18, but it should be understood that the present invention is broadly applicable to any data network which is capable of reaching or connecting a relatively large number of users 16 to provide a wide cross-section of users. Such data network can be, for example, WebTV, InteractiveTV, WAP+ mobile services, or any other interactive channel.

Content system 10 and communication management system 12 can provide a completely automated solution by dynamically segmenting users 16, automatically generating personalization rules, and delivering web pages, offers for products/services, or other interactive communication to achieve desired objectives. In other words, content system 10 and communication management system 12 can determine what matters to users 16 and then use this information to optimize interactive communications to achieve specific outcomes/objectives, such as, for example, increasing sales and profits, improving electronic marketing effectiveness, and powering specific business intelligence applications.

Content System and Communication Management System

Figure 2:
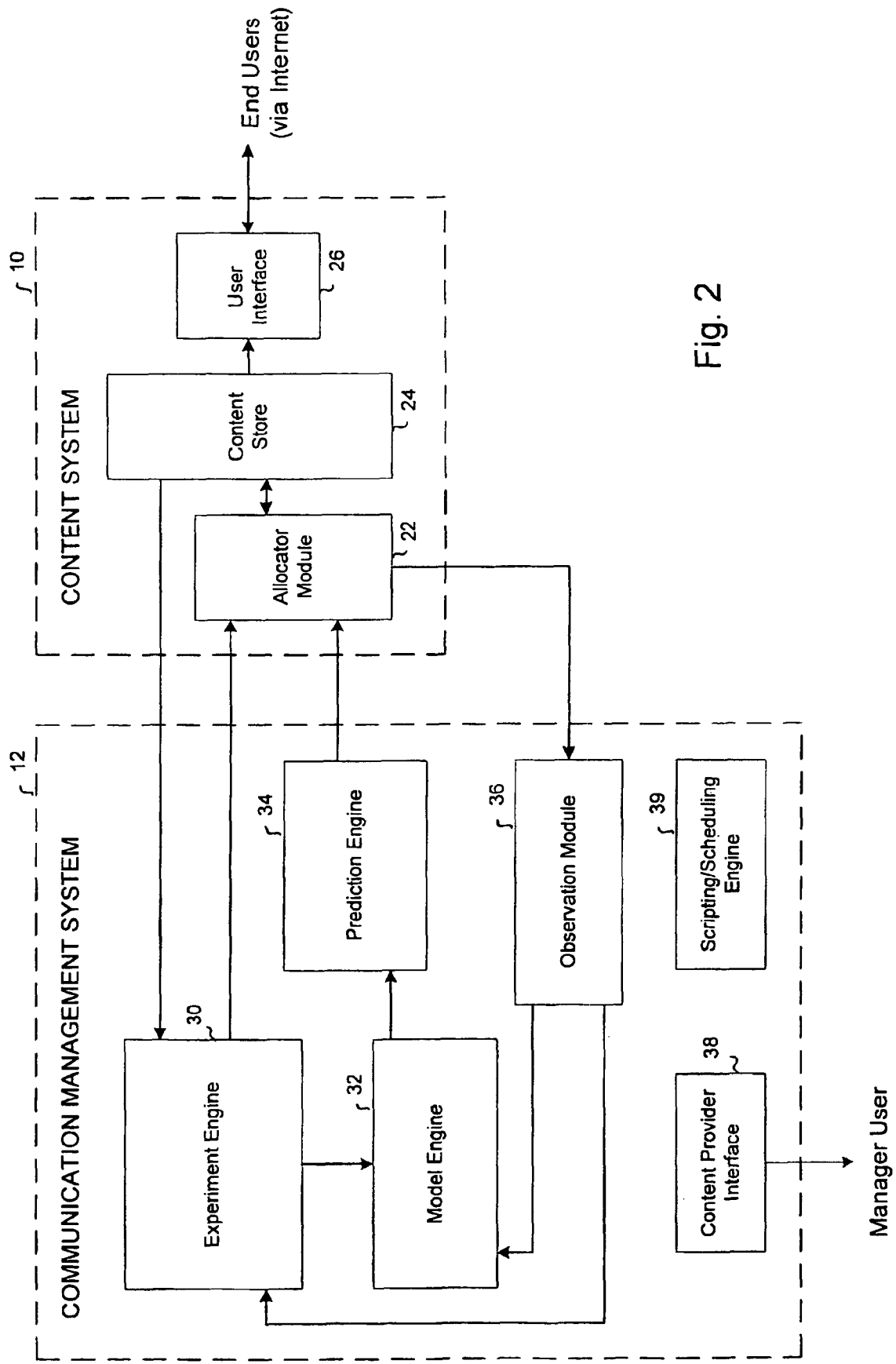
FIG. 2 is a block diagram for a content system and a communication management system, according to an embodiment of the present invention.

FIG. 2 is a block diagram for content system 10 and communication management system 12, according to an embodiment of the present invention. Content system 10 and communication management system 12 cooperate to enhance any application of structured content. As depicted, content system 10 includes an allocator module 22, a content store 24, and a user interface 26. Communication management system 12 includes an experiment engine 30, a model engine 32, a prediction engine 34, an observation module 36, a content provider interface 38, and a scripting/scheduling engine 39.

In content system 10, content store 24 functions to store content 15 which may be delivered and presented to various users 16 via, for example, the Internet 18. This content 15 may include, for example, images and/or descriptions of various goods or services which are being offered for sale, price quotes for each good or service, detailed information about on-line ordering, listings for various areas of interest, links to one or more websites, banner advertisements, etc. All or a portion of this content 15 can be maintained in digital form. Content store 24 may be implemented in any one or more suitable storage media, such as random access memory (RAM), disk storage, or other suitable volatile and/or non-volatile storage medium. In one embodiment, content store 24 may comprise a relational database.

User interface 26 is connected to content store 24. User interface 26 generally functions to provide or support an interface between content system 10 and one or more users 16, each using a suitable client computer connected to Internet 18. User interface 26 may receive requests for content 15 from the users 16. An exemplary request can be a request for a web page displaying a particular line of products, and may specify a particular identifier for the web page, such as, for example, a uniform resource locator (URL). Furthermore, the web page request can be related to a user's action of "clicking" on a particular hyperlink on a web page. In response to such requests, user interface 26 delivers or presents content 15. The interconnectivity of components of user interface 26 may be supported with suitable communication hubs, routers, or otherwise, as may be used in the underlying architecture of the data network (e.g., Internet 18) responsible for delivery of content.

Allocator module 22, which, is connected to content store 24, may comprise one or more programs which, when executed, perform the functionality described herein. Allocator module 22 generally functions to allocate (i.e., cause to be delivered) content 15 to various users 16. Allocation can be done, for example, based on the following: information available about users 16; and commands from other elements or modules within content system 10 or communication management system 12, which may place any given user 16 in an experiment or deliver content according to predictions and models.

As such, allocator module 22 may be responsive to requests for content 15 from users 16. For each request, allocator module 22 may allocate a content structure or treatment for purposes of experimentation or based on a prediction of what will achieve a desired outcome/objective. To accomplish this, allocator module 22 may apply situation specific rules, such as experiment rules and prediction rules (described herein). Also, allocator module 22 may sample all traffic, at the website or portal in order, for example, to determine which users 16 will be assigned to receive controlled communication (i.e., specific content). Thus, allocator module 22 provides guidance to content system 10 on what content 15 to display on a user-by-user basis. Allocator module 22 is coupled to observation module 36 in communication management system 12 and may store observation data therein on behalf of the content system 10.

Allocator module 22 also supports or provides an interface between communication management system 12 and content system 10. As such, allocator module 22 may include a suitable application programming interface (API) which can interact and integrate with Web server software (e.g., available from NETSCAPE, APACHE, or JAVA SERVLET) and management application software (e.g., VIGNETTE, SPECTRA, or BROADVISION).

The functionality of allocator module 22 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Communication management system 12 is in communication with content system 10. Referring to communication management system 12, experiment engine 30 is coupled to content store 24 and allocator module 22 (both in content system 10). Experiment engine 30 may receive definitions for various experiments and content 15. Experiment engine 30 may comprise one or more programs which, when executed, perform the functionality described herein. Experiment engine 30 generally functions to support the creation and execution of one or more experiments to test the behavior or reaction of users 16 to particular content 15 and/or the particular way in which the content is formatted (i.e., treatments). For each experiment, experiment engine 30 may generate a set of rules which dictate how treatments are allocated during the course of the experiment. The experiments created and executed by experiment engine 30 may include, for example, full factorial experiments and designed fractions of full factorial experiments (also referred to as simply "designed experiments").

In a full factorial experiment for a given set of content elements, every possible combination of content elements is considered. Each content element may constitute a factor to be considered and analyzed. A full factorial experiment allows estimation of the effect of each factor in isolation. That is, the results from a full factorial experiment include all information about the main effect that each content element has on the observed outcome independent of every other content element. A full factorial experiment also estimates the effect of each and every interaction between all possible combinations of factors.

For example, consider a case in which there are two types of content elements: a banner advertisement and a text message which can be displayed below the banner advertisement. Each content element may have two variations. For banner advertisement, the variations can be static and moving. For messages, the variations can be "click here now" and "save 20%." Thus, there are four possible combinations that can be viewed: (1) static banner advertisement with a "click" message, (2) static banner advertisement with a "save" message, (3) moving banner advertisement with a "click" message, and (4) moving banner advertisement with a "save" message. The main effects for each element (i.e., static, moving, "click," and "save") as well as the interaction effects for all possible combinations of the same, can be observed. Thus, the entire space of all possible effects can be estimated. Because a full factorial experiment considers all possible alternatives for content structure, it supports a very thorough analysis of observed outcomes.

As the number of variables in an experiment are increased linearly, however, the number of combinations of content elements increases exponentially. That is, when another content element or variation is added to a given experiment, the number of combinations for the experiment can increase significantly. For example, for four content elements, each having three variations, eighty-one combinations are possible. For five content elements, each having four variations, the number of possible combinations is 1024. In view of this, a full factorial experiment can produce more combinations than reasonable for purposes of experimentation—i.e., the time required to satisfy the sampling requirements may be unacceptably long, given the rate of "hits" to a website.

Designed experiments reduce the number of combinations required for experimentation (relative to full factorial experiments), while still allowing measurement and estimation of the effects that are of interest. Designed experiments typically focus on a relatively small group of effects of particular interest; while controlling for all other effects. Designed experiments use an experimental design to control specific events and the conditions under which those events occur, thus allowing the effect of such events in relation to some observed outcome to be explicitly measured and estimated. In other words, a designed experiment is a systematic way to vary one or more variables which can be controlled (e.g., background color of an advertisement, screen placement of advertisement, size of advertisement) and investigate the effects such variances have on one or more outcomes of interest. Designed experiments may consider only the main effects of the variables. Accordingly, designed experiments reduce the information involved in an experiment (e.g., the number of combinations), thus offering a potentially vast reduction in sampling requirements (e.g., the minimum number of users 16 required to participate in the experiment).

For example, for five elements, each having four variations, if it is assumed that there are no important interaction effects, experiment engine 30 may create a designed experiment that will allow measurement and estimation of all the main effects (i.e., those that do not involve interactions) with only sixteen combinations, rather than the 1024 combinations required for a full factorial experiment.

Experiment engine 30 may generate designed experiments in a number of ways. For example, experiment engine 30 may include or incorporate various look-up tables, such as, for example, tables published by the U.S. National Bureau of Standards. In addition to tables, designed experiments can be generated using algorithms which, when run, will create the appropriate tables meeting the criteria for which the algorithm is designed. These tables and algorithms can be used to identify appropriate constraints upon behavioral models (described herein). Furthermore, designed experiments can be created by random selection for variable values, or via programmed search algorithms through the full factorial space.

Designed experiments may be described using a number of important criteria. For example, designs may be described by the specific effects they allow; the number of factors and factor levels included and whether or not there are the same number of levels in each factor; and the amount of information produced in relation to the objective outcome. Experiment engine 30 may employ any or all of these methods to find or produce the best designs to use for a particular application.

Designed experiments allow communication management system 12 to make inferences about some of the variables that drive the choices of users 16. These designed experiments may implement or support an understanding of random utility theory (RUT). Random utility theory postulates that the true value to a user of some item (e.g., a banner advertisement or a web page) cannot be observed because it is a mental quality in the user's mind. That is, the thought process by which a user arrives at a particular decision cannot always be captured or observed. In view of this, designed experiments allow communication management system 12 to make inferences about some of the variables that drive user choices based upon what users actually do, not what they think or express.

In one embodiment, experiment engine 30 provides functionality for the following: a) full factorial experiments which consider all possible combinations, b) designed experiments which consider the minimum possible combinations ("main effects only"), and c) designed experiments that estimate all two-variable interactions or selected two-variable interactions.

Model engine 32 is in communication with experiment engine 30 and may obtain the definition of various experiments therefrom. Model engine 32 may comprise one or more programs which, when executed, perform the functionality described herein. The data produced from each experiment specifies outcomes relevant to the objectives set by content provider 14. Once the experiments are completed, this data may transferred to model engine 32 to identify the degree to which the content elements influence the behavior of users 16. That is, model engine 32 uses the results or data collected during the various experiments to create one or more behavioral models of human decisions and choices.

In general, a model attempts to predict what users 16 may do in the future based on observations made of past behavior from users with similar characteristics. A behavioral model may comprise a sophisticated, continuous, and discrete multivariate statistical model which can be used to determine what aspects of a content structure or treatment influence the probability of achieving a particular outcome. All actions that users 16 take in an interactive environment potentially can be observed and modeled using forms of choice models based on random utility theory. That is, the observed behavioral characteristics of users 16 maybe embedded in choice models resulting from designed experiments. The models can model the behavior of users 16 in terms of how the users respond to different stimuli (e.g., treatments). Model engine 32 performs this analysis and suggests which treatments to present to users 16 in the future in order to meet the desired objectives.

A behavioral model can be, for example, a statistical abstraction of an unknown decision-making process used by a user to make particular decision, such as, for example, whether to click on a particular banner advertisement, whether to purchase a particular product being offered, etc. Thus, although a user's decision-making process cannot be observed, behavioral modeling attempts to approximate these processes statistically using random utility theory developed and refined by econometricians and psychometricians. The unexplained component of a user's choice may be considered to be the deviation of that user from what a behavioral model predicts. This is "stochastic" is the sense that there is an element of user behavior that cannot be explained.

The models generated by model engine 32 may thus model and predict the probability that a randomly selected user 16 from some sample or segment will perform a particular action or combination of actions when faced with a number of possible actions. As such, the behavioral models may consider user choices. These choice models do not predict the exact choice that will be made by a user, but rather the probability that a any given user will choose a particular action. In particular, choice models describe how the probability of users' choices or decisions (i.e., their behavior) will vary according to one or more elements that were manipulated in a respective experiment or according to users' profiles. Choice models thus consider variables that describe the options for choices (e.g., prices, discount levels, colors of products offered at a website) and the variables that describe users 16 (e.g., time of day, day of week, Internet service provider (ISP), operating system for an application). Inclusion of variables that describe users 16 allow choice models to be used to optimize content, offers, etc. for particular user profiles. For example, once model generator 32 has generated a model that predicts how choice probabilities of users 16 vary with background color and page placement, as well as time of day, day of week and ISP, then prediction engine 34 and model engine 32 can predict which color and placement location should be provided or displayed to any given user to optimize an objective (e.g., to maximize click rates). Thus, the model may be used to determine what set of content 15 is most suitable for achieving a desired outcome.

In one example for a choice model, the unexplained component of users' decision making processes is distributed according to a Gumbel distribution. The deviations of each choice from that distribution sum to zero, and each deviation is independent and has the same variance. This produces a model known as a multinomial logit (MNL) model. For a situation with multiple choices, the MNL model can be expressed as follows:

$$P(i|C) \propto \exp(V_i)/\Sigma_j \exp(V_j), \text{ for all } j \text{ offered in } C.$$

In the above equation, $V_i$ and $V_j$ are the values of the ith and jth choice options (actions, choices), exp is the exponential operator (i.e., eV), and C is the set of possible actions or choices. In application of the MNL model, the V's are estimated as linear-in-the-parameters functions of the variables of interest. That is, the V's are expressed as multiple-regression-like functions of some predictor variables (e.g., color of an advertisement, placement of an advertisement, time of day for observed behavior, user's ISP, the interaction of advertisement color and ISP, etc.). Parameters are estimated for each variable from the data obtained as the outcome of experimentation. The parameters then are used in the MNL model to predict the probability that a particular user profile will choose a particular choice option (action). Alternatively, the results of the model are used to determine what particular combination of variables (i.e., treatment) to show to a user with a particular profile, such as, for example, which combination of advertisement color and placement should be displayed to a user with AOL as an ISP and who interacts with the website between 2:00 a.m. and 3:00 a.m. on a Tuesday.

Model engine 32 may implement techniques for choice modeling, Bayesian modeling, or other useful modeling for the choices of users 16 (e.g., visitors to a website) as revealed, for example, in their click patterns, responses to questions, session times, purchases, registrations, return visits, option selections, etc. In one embodiment, the modeling may implement techniques of Bayesian Markov Chain Monte Carlo estimation procedures. Model engine 32 may use a structure, referred to as a "model instruction," which allows the model engine 32 to extract that part of the experiment data required for modeling from observation module 36.

Prediction engine 34 is in communication with model engine 32 and allocator module 22. Prediction engine 34 may comprise one or more programs which, when executed, perform the functionality described herein. From the experimentation and modeling, prediction engine 34 functions to generate or create one or more predictions. A prediction can be a simple description of a model which is used to deliver content 15 to users 16 in a way which is most effective to achieve one or more desired outcomes/objectives. For example, a prediction may predict that a user 16 with certain characteristics will, for a particular website, click through to key web pages, buy merchandise at the website, visit between the hours of 9:00 p.m. and midnight, or any other strategic objective of interest.

In one implementation, prediction engine 34 may identify from a model that set of content elements which is predicted to be most likely to cause any given user who visits the website to behave consistently with the model's objective (i.e., consistent with a particular goal or objective of the content provider 14). In another implementation prediction engine 34 may allow content provider 14 to make such an identification.

Prediction engine 34 may generate predictive covariates, which can be used when allocating content 15 to users 16 in response to requests for the same. That is, prediction engine 34 may generate prediction rules for targeting specific content to certain kinds of users 16, thus providing personalization in the delivery of content 15. The prediction rules can be a set of rules which match different types or classes of users 16 to specific content 15. Accordingly, prediction engine 34 converts a model.(which provides an abstract description of observed behavior) into a simple set of rules that attempts to optimize desired behavior. The prediction rules are forwarded to allocator module 22 for application in the delivery of content 15 to users 16.

The functionality of each of experiment engine 30, model engine 32, and prediction engine 34 can be performed by any suitable processor such as a main-frame, file server, workstation, or other suitable data processing facility running appropriate software and operating under the control of any suitable operating system, such as MS-DOS, MacINTOSH OS, WINDOWS NT, WINDOWS 2000, OS/2, UNIX, XENIX, GEOS, and the like.

Observation module 36 communicates with allocator module 22 (in content system 10), experiment engine 30, and model engine 32. Observation module 36 generally functions to maintain or store observation data. Observation data can be information or data relating to the observed behavior of users 16 which visit the website of content provider 14. The observation data can be collected for each experiment conducted by communication management system 12, and thus, can include information for the experimental conditions and the observed outcomes. Furthermore, observation data stored in observation module 36 can include data for a number of variables, such as experiment variables, covariates, and dependent variables. Experiment variables may relate to or represent content itself. For example, experiment variables may relate to or specify the content treatments for an experiment and a time period for experimentation. Experiment variables can be controlled and may be considered independent variables. Dependent variables relate to or represent outcomes. For example, dependent variables may relate to the observed behavior of users, prior or subsequent to a treatment allocation. Dependent variables will typically be components of the goal function which is to be optimized. As an illustrative example, dependent variables may relate to the allocation of treatments and the successes or failures for such allocation. An instance of a treatment allocation is deemed to be a "success" if a user 16 reacts in a desired manner to the treatment; an instance of a treatment allocation is deemed to be a "failure" if a user 16 does not react in a desired manner to the treatment. Covariates are variables which relate to or represent users 16. For example, covariates may relate to characteristics of an end user (e.g., particular computer and web browser). Further, covariates may relate to characteristics of usage (e.g., buttons clicked, navigation options selected, information submitted, purchases made, etc.). Observation data may also include information available from the data log or customer database of a website. With this data and information, communication management system 12 may segment users 16 into discrete groups or specify a distribution of users 16, wherein each grouping or distribution is characterized by a particular set of behavioral outcomes.

Observation module 36 may be implemented in any one or more suitable storage media, such as random access memory (RAM) disk storage, or other suitable volatile and/or non-volatile storage medium. In one embodiment, observation module 36 may comprise a relational database.

Content provider interface 38 can be in communication with content store 24 (in content system 10), experiment engine 30, and observation module 36. Content provider interface 38 receives model results and initiates analysis, evaluation, selection, calibration, and basic reports. Content provider interface 38 generally supports an interface between communication management: system 12 and a human user at content provider 14, such as an information services manager. Content provider interface 38 allows the manager user to ask questions, record and test scenarios, and generate or obtain reports to quantify results.

For example, content provider interface 38 allows a manager user to assist in the set up and management of the processes for experimentation, modeling, and prediction performed by communication management system 12. Content provider interface 38 may receive new content 15 for input into content store 24, and definitions for forwarding to experiment engine 30. In one embodiment, content provider interface 38 can be used to define the conditions and space for various experiments, the attributes and levels that will be manipulated, individual data tracked, and to initiate the generation or creation of various experimental designs. Furthermore, content provider interface 38 may allow the manager user to view and analyze data, both in raw form straight from the observation module 36, and also in model form from model engine 32.

The functionality of content provider interface 38 can be performed by one or more suitable input devices, such as a key pad, touch screen, input port, pointing device (e.g., mouse), microphone, and/or other device that can accept information, and one or more suitable output devices, such as a computer display, output port, speaker, or other device, for conveying information, including digital data, visual information, or audio information. In one embodiment, content provider interface 38 may comprise or be operable to display at least one graphical user interface (GUI) having a number of interactive devices, such as buttons, windows, pull-down menus, and the like to facilitate the entry, viewing, and/or retrieval of information.

Scripting/scheduling engine 39 may be in communication with allocator module 22, experiment engine 30, model engine 32, prediction engine 34, and content provider interface 38. Scripting/scheduling engine 39 may comprise one or more programs which, when executed, perform the functionality described herein. Scripting/scheduling engine 39 generally functions to manage the overall operation of communication management system 12 and content system 10.

Scripting/scheduling engine 39 provides or supports the generation of scripts which coordinate the behavior, activity, and/or interaction of allocator module 22, experiment engine 30, model engine 32, predictor engine 34, and observation module 36. Accordingly, scripting/scheduling engine 39 may automate the entire process of experimentation, modeling, and prediction described herein. Essentially, each script may direct one or more elements in content system 10 or communication system 12 to perform a particular action or set of actions.

For example, scripting/scheduling engine 39 supports the set up of the various experiments which may be conducted to gauge the behavior or reaction of users 16. For each experiment, scripting/scheduling engine 39 may generate or supply definitions. These definitions can be supplied to allocator module 22 for performing experiments. In addition, scripting/scheduling engine 39 may monitor for the completion of an experiment, and subsequently, direct model engine 32 to build or generate a model from the experimental data. Scripting/scheduling engine 39 may generate or supply scripting for converting the results of such experiments into models and, ultimately, predictions, which are designed to achieve specific outcomes/objectives. Scripting/scheduling engine 39 may deliver instructions to model engine 32 on how to build a model. These instructions may specify data locations within observation module 36 and names for each of a number of variables (e.g., experiment variables, covariates, and dependent variables), translations in encoding for easier modeling, conversions of data from continuous to discrete and model form, and any other parameters. Scripting/scheduling engine 39 may create a time-related interpretation for the state of the model for use by allocator module 22 in dealing with user requests for content 15. Furthermore, scripting/scheduling engine 39 may provide instructions or commands to allocator module 22 for delivering content 15, either for experimentation or pursuant to models/predictions. Each script may include basic error handling procedures.

The functionality of scripting/scheduling engine 39 can be performed by any suitable processor, which can be the same or separate from the processor(s) for experiment engine 30, model engine 32, and prediction engine 34.

In operation, generally speaking, content provider interface 38 may receive experimental definitions from a content provider 14. In one embodiment, for example, a manager user at content provider 14 inputs data relating to past website traffic or samples; from current website traffic in order to determine how to set up and schedule an experiment. Using the experimental definitions, experiment engine 30 designs one or more experiments for a particular set of content 15. Each experiment may involve a plurality of content structures or treatments for the content. One of the treatments serves as a control treatment, while the remaining treatments serve as experimental treatments. For each experiment, experiment engine 30 may generate a separate set of experiment rules which dictate how the treatments are delivered during experimentation. These experiment rules are forwarded to allocator module 22.

Allocator module 22 allocates the different treatments to various users 16 in response to requests for content from the same. This allocation is done in accordance with the rules for experiments designed by experiment engine 30. During experimentation, communication management system 12 observes the behavior of the users to each treatment and collects or stores data on these observations in observation module 36. This includes data for experiment variables, covariates, and independent variables.

Using the observation data, model engine 32 generates one or more models for each experiment conducted. These models may capture the relationship between the incidence of the objective behaviors by users 16 and a set of controlled content variables and details about the users visits.

From the experimentation and modeling, communication management system 12 may modify or customize the treatments of content 15 which are delivered to users 16. In particular, prediction engine 34 generates one or more predictions, which are used to deliver content 15 to users 16 in a way which is most effective to achieve one or more desired outcomes/objectives. In one embodiment, prediction engine 34 automatically searches the results of experimentation and modeling for the optimal content structure or treatment and recommends that for delivery to users 16. In an alternative embodiment, prediction engine 34 allows a human user (e.g., information systems manager) at content provider 14 to specify a plurality of optimal content structures or treatments for delivery to users 16. Prediction engine 34 generates a set of prediction rules which can be forwarded to allocator module 22 in content system 10.

Each of the processes of experimenting, modeling, and predicting may be repeated. By continuously experimenting with content 15 that will be delivered to users 16, content system 10 and communication management system 12 systematically isolate the effects of different attributes of the communication on desired outcomes/objectives. By modeling segments or individual users 16 based on this continuous experimentation (as described herein), content system 10 and communication management system 12 can automatically and accurately generate and define rules for presenting custom communication to achieve or increase the desired outcomes/objectives.

As such, content system 10 and communication management system 12 implement a systematic approach for the design and development of interactive communication to optimize, enhance, or otherwise improve product development, public relations, customer service, advertising effectiveness, electronic commerce, or any other application which can benefit from real time mass customization of content 15.

Experiment Engine

Figure 3:
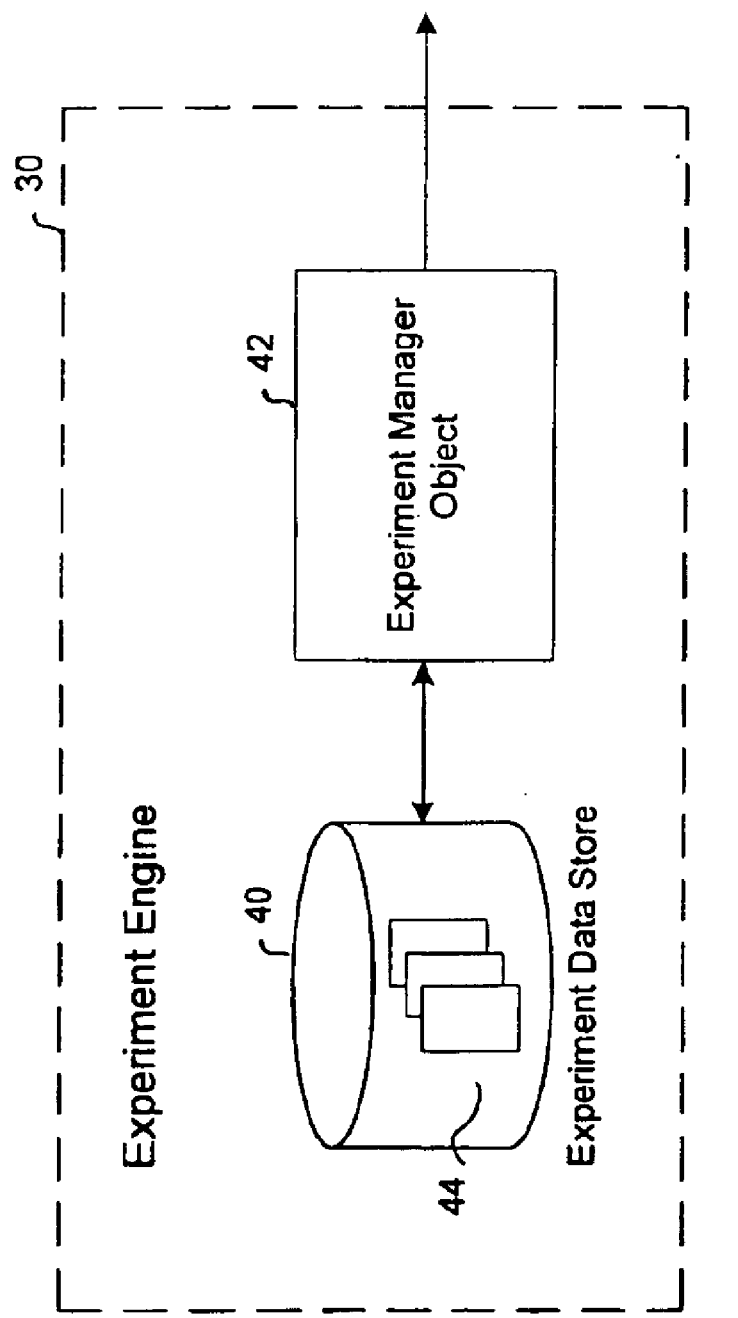
FIG. 3 is a block diagram for an experiment engine, according to an embodiment of the present invention.

FIG. 3 is a block diagram of an experiment engine 30, according to an embodiment of the present invention. Experiment engine 30 generally supports the creation and execution of one or more experiments to test the behavior or reaction of users 16 to particular content 15 and/or the particular way in which the content is formatted (i.e., treatments). In one embodiment, experiment engine 30 allows a manager user at content provider 14 to automatically select and implement a designed experiment from a variety of possible designed experiments especially suitable for interactive content experiments. As depicted, experiment engine 30 includes an experiment data store 40 and an experiment manager object 42.

Experiment manager object 42 generally functions to control or manage the execution of various experiments. Experiment manager object 42 allows the set-up of designed experiments. For example, experiment manager object 42 supports the specification of one or more experiment variables which can be investigated or considered as to their effects on one or more outcomes/objectives of interest. Such experiment variables can be, for example, background color, location on a web page, or special discount. Furthermore, for each experiment variable, experiment manager object 42 supports the specification of one or more levels. For example, for an experiment variable of background color, levels can include "blue," "pink," "yellow" and "green." For an experiment variable of location on a web page, levels can include "top center," "right bottom," "lower left," and "middle right." For an experiment variable of special discount, levels can include "10% off," "15% off," "20% off," " "25% off," "30% off," "35% off, "40% off," and so on. From the above, it can be seen that the experiment variables can be inherently discrete (e.g., background color) or inherently continuous (e.g., special discount). In one embodiment, the variables and associated levels can be selected by a manager user.

Once experiment variables and levels have been selected, experiment manager object 42 can specify different combinations or values of content 15. Experiment manager object 42 may generate the content structures or treatments to be delivered for each experiment and determine the conditions for delivery (e.g., to whom and when). To accomplish this, experiment manager object 42 may use any or all of the experiment engine functionality described herein (e.g., tables, search algorithms, etc.). Across these treatments, the levels for each experiment variable are systematically varied.

From the set of all possible content structures or treatments for a given set of content 15, a subset may be selected for experimentation. More specifically, experiment manager object 42 may select from the set of all possible treatments a sample of those in a particular way to optimally address the desired objectives or outcomes. This allows communication management system 12 to investigate a larger number of, and more complicated, content issues than otherwise possible, while also insuring that the system (and therefore the manager user) will know which element of content had what effect on user behavior, and therefore what treatment is optimal for future delivery to site visitors. Each treatment of the selected subset may be considered to be a "control" content structure. Control implies that the different levels for experiment variables in the treatments are under the control of, or can be specified by, communication management system 12 or the manager user.

Experiment manager object 42 may also define or implement statistical sampling procedures. These statistical sampling procedures are used to select, from all users 16 visiting the website maintained by content provider 14, a number who will receive the control content structures or treatments. This selection can be accomplished using a combination of user-profiling (e.g., segmentation, which may include a segment comprising all users) and/or statistically valid random selection techniques. In one embodiment, experiment manager object 42 may allow a manager user at content provider 14 to specify, either implicitly or explicitly, a particular target population of users 16 to receive the control treatments. For example, experiment manager object 42 may allowing a manager user to select a fraction of the total website traffic, and then design and implement an experiment that can be applied to a this fraction of the total traffic. With the sampling procedures available from experiment manager object 42, the manager user may set quotas for particular samples or for sampling from particular populations of users, wherein each population may have some characteristics in common (e.g., ISP, time of use, etc.).

Experiment manager object 42 may also specify when, and for how long, each experiment will be run, for example, based on input from a manager user.

Experiment manager object 42 may keep track of the experiments under way at a given time and the users 16 participating in each experiment. Experiment manager object 42 may also, via scripting/scheduling engine 39, direct other engines or elements in communication management system 12 or content system 10 to collect data and information about each experiment as it is being conducted. For example, experiment manager object 42 may direct allocator module 22 to collect observation data for the various experiments and to store this data in observation module 36. Thus it is possible to determine what experiments have been done, what experiments are underway, and what parts of the experimental space remain for experimentation. Furthermore, for each experiment, experiment manager object 42 may generate a set of rules which direct allocator module 22 on how treatments should be allocated during the course of the experiment.

In one embodiment, experiment manager object 42 may be implemented or comprise a set of interface objects which can be delivered between various components or modules of communication management system 12 and content system 10.

Experiment data store 40 is in communication with experiment manager object 42. Experiment data store 40 functions to store experiment data 44. Experiment data 44 generally comprises data and information relating to the experiments created and executed by experiment engine 30. This includes data/information for both past (historical) experiments and experiments currently in progress. For each experiment, experiment data 44 may specify, for example, the definitions and parameters defining the experiment, the content 15 which is used during the experiment, the variables specified for the experiment, the levels for each experiment variable, the content structures or treatments considered during the experiment, the objective behavior being tracked for each experiment, the experiment rules for each experiment, and a definition or recognition pattern for the users 16 who are allocated to participate in the experiment.

Experiment data 44 may also specify or include data used to set up the experiments. In one embodiment, this data may include one or more tables. Each table can be associated with a respective experimental design. These tables can be "filled in" with data and information entered, for example, by experiment manager object 42 (optionally cooperating with a manager user at the content provider 14), in order to create experiments specifically designed for the content provider 14. Experiment data store 40 also stores information relating to the ability of the content system 10 to experiment.

Experiment data store 40 may be implemented in any one or more suitable storage media, such as random access memory (RAM), disk storage, or other suitable volatile and/or non-volatile storage medium. In one embodiment, experiment data store 40 may comprise a relational database.

With experiment engine 30, communication management system 12 can select, from the set of all possible content structures or treatments for a given set of content 15, a sample with which to experiment to optimally address a desired objective or outcome. This allows communication management system 12, cooperating with content system 10, to investigate not only a large number, but also more complicated, content issues than otherwise possible. Communication management system 12 is thus able to determine which content structure or treatment had what effect on users 16, and therefore, what content is optimal for future delivery to other users.

Model Engine

Figure 4:
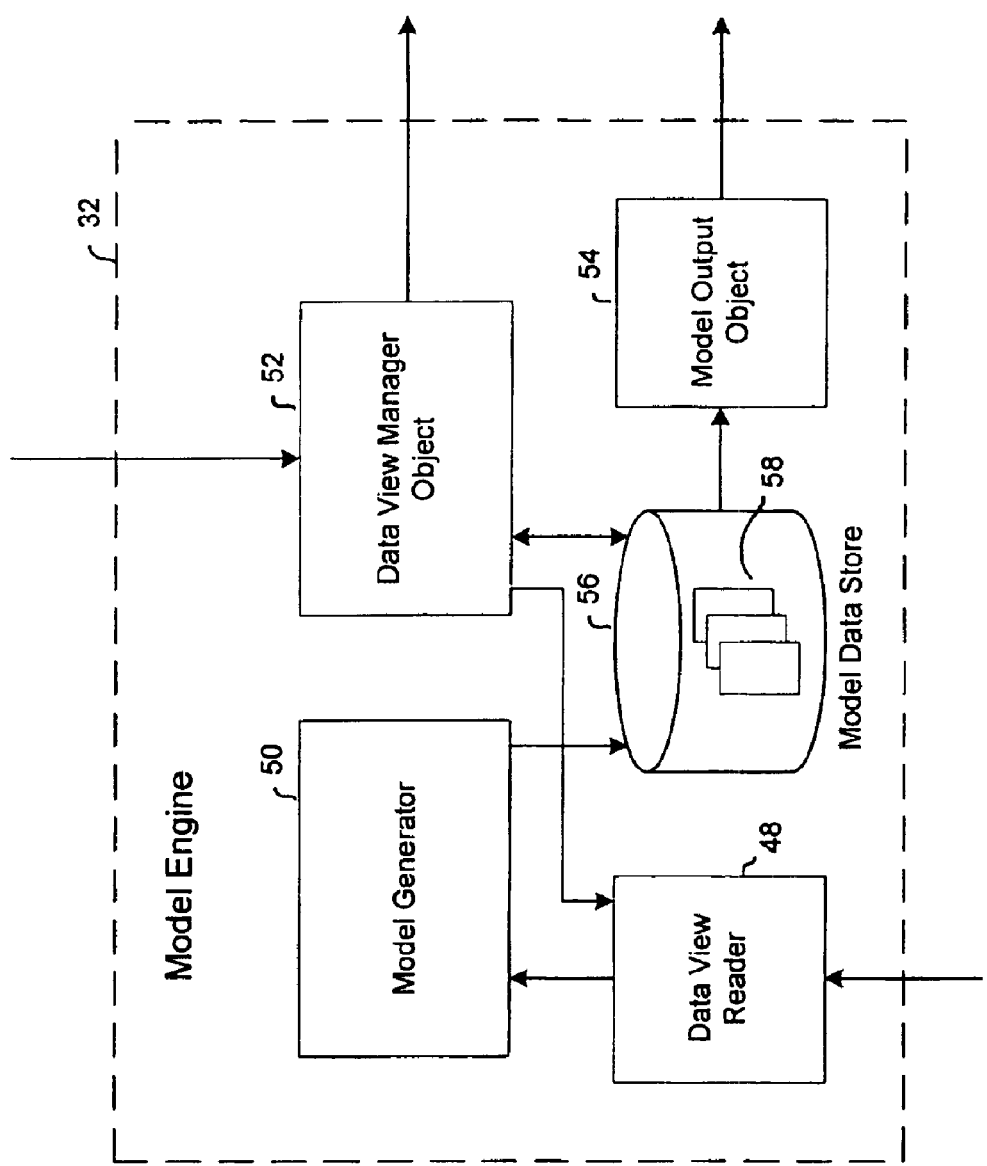
FIG. 4 is a block diagram for a model engine, according to an embodiment of the present invention.

FIG. 4 is a block diagram of a model engine 32, according to an embodiment of the present invention. Model engine 32 generally functions to create or build behavioral models from data gathered during experimentation. As depicted, model engine 32 includes a data view reader 48, a model generator 50, a data view manager object 52, a model output object 54, and a model data store 56.

Data view reader 48, which may be in communication with observation module 36, generally functions to retrieve or read observation data collected during experimentation. This observation data may include data relating to the treatments delivered to various users 16 during experimentation and the outcome for each delivery. At least some reactions of users 16 to various treatments can be observed (e.g., a user may ultimately purchase a product which is offered in a particular treatment), and thus, can be considered to be an objective behavior.

Model generator 50, which is in communication with data view reader 48, receives the observation data. Model generator 50 transforms the observation data into a format that can be statistically analyzed. Using the observation data, model generator 50 generates one or more behavioral models. These behavioral models may capture the relationship of the incidence of the objective behaviors, the set of controlled content variables (e.g., placement or background color of a banner advertisement), and users 16 to whom content is delivered. Choice models are behavioral in the sense that they describe how the probability of users' choices or decisions (i.e., their behavior) will vary as the levels for any number of variables are manipulated in an experiment. The models are useful for situations that involve interpolation for values not observed and/or predictions about treatments not administered during experimentation. In one embodiment, model generator 50 may generate one or more contingency tables. Contingency tables are a form of model. Each contingency table can be a report which is useful for situations with a small number of defined outcomes. Contingency tables can be used to check that complex forms of models will succeed. By analyzing a contingency table, communication management system 12 can identify data that will cause complex models to fail an estimation step. Contingency tables are very complete and relatively fast forms of modeling.

Model generator 50 can be implemented with algorithms for choice modeling, Bayesian modeling, neural networks, decision trees, or other relevant modeling algorithms. At least some of these algorithms for modeling are publicly available, for example, in various academic publications or commercially available software. In one embodiment, model generator 50 can be implemented with MATLAB libraries and object code compiler.

Model data store 56 is in communication with model generator 50. Model data store 56 generally functions to store and maintain model data 58. Model data 58 can be any information and data for creating, describing, defining, and implementing the models described herein. For each model, model data 58 can specify, for example, an identifier for the model, variables describing the choice options available under the model (e.g., prices, discount levels, background colors), variables describing users 16 (e.g., time of day that user interacts, day of week that user interacts, Internet service provider (ISP) for the user, operating system for the user's computer, etc.), the contents of one or more legacy systems, demographic information, etc.

Model data storage 56 may be implemented in any one or more suitable storage media, such a random access memory (RAM), disk storage, or other suitable volatile and/or non-volatile storage medium. In one embodiment, model data store 56 may comprise a relational database.

Data view manager object 52 is in communication with model data store 56 and data view reader 48. Data view manager object 52 generally functions to output the various models to a human user (e.g., information system manager) at content provider 14 via data view reader 48 for interpretation by the same. In one embodiment, data view manager object 52 may be implemented or comprise a set of interface objects which can be delivered between various components or modules of communication management system 12 and content system 10.

In one embodiment, content provider 14 may store user information in separate databases which may be incorporated into model data store 58. For example, an on-line banking application supported by a content provider 14 may draw data from a user's Internet session as well as from a financial institution's corporate database. In such case, data view manager object 52 would link the corporate database to model data store 56.

Model output object 54 is in communication with model data store 56. Model output object 54 generally functions to output the various models to prediction engine 34 for conversion or use as predictions. In one embodiment, model output object 54 may be implemented or comprise a set of interface objects which can be delivered between various components or modules of communication management system 12 and content system 10.

Prediction Engine

Figure 5:
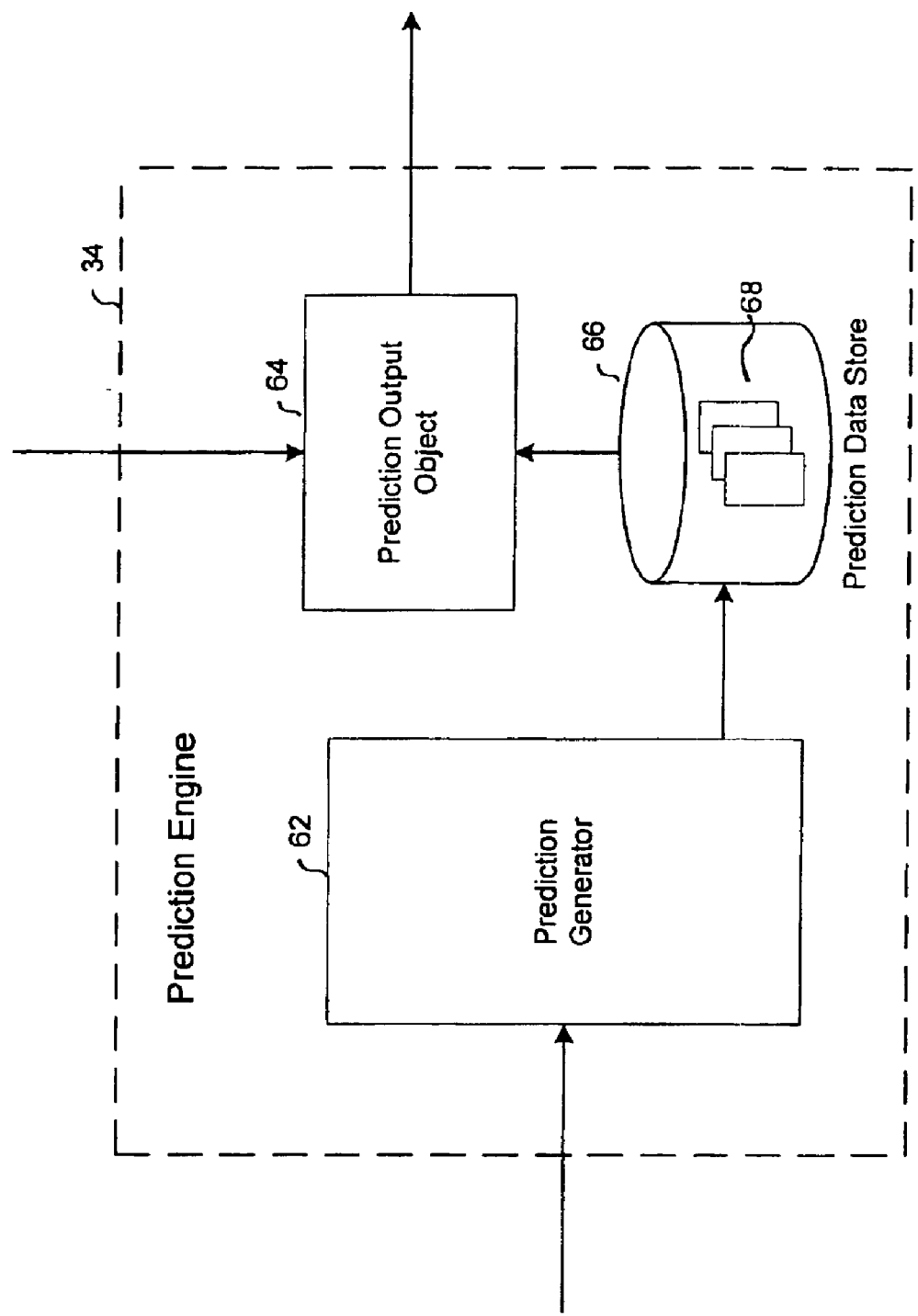
FIG. 5 is a block diagram for a prediction engine, according to an embodiment of the present invention.

FIG. 5 is a block diagram of a prediction engine 34, according to an embodiment of the present invention. Prediction engine 34 generally functions to create or build predictions using behavioral models. As depicted, prediction engine 34 includes a prediction generator 62, a prediction output object 64, and a prediction data store 66.

Prediction generator 62 generally functions to generate one or more predictions which predict, for example, how various users 16 may react to particular content. These predictions may be considered to be a mass customization process. The predictions use the revealed (observed) preferences of users 16 as embodied in a model to generate statistically viable prediction rules. Prediction generator 62 may receive input from model engine 32 and content provider interface 38 to develop rules for targeting content 15 to specific users 16 in order to achieve desired objectives/outcomes (e.g., sales of a product), thus optimizing the delivery of content 15. This can be accomplished by converting various models output by model engine 32.

In one embodiment, prediction generator 62 may implement a personalization process. In the area of interactive communications, a personalization process can be a process whereby content 15 is targeted and delivered to users 16 based on either their stated or implied preferences. An exemplary personalization process may comprise data mining techniques used to profile or segment users 16. Segmentation refers to the breakdown, division, or separation of users 16 into various, discrete groups or segments. Each grouping or segment can be a specification or distribution of users with similar behavioral characteristics. The behavior of users 16 within a given segment tends to be more homogenous, whereas the behavior of users 16 between segments tends to be less homogenous. Segments can range from none (a mass undifferentiated market) to unique individuals.

Segments of users 16 can be determined in the modeling process based upon information identified for particular users 16 who are disposed to react in unique ways towards the content 15 as observed in their site related behavior. To implement segmentation, the defining information for each segment is tracked for user interactions. This can be accomplished with segmentation rules. A separate set of segmentation rules can be programmed or provided for each segment of users 16. These rules may specify details for delivering content 15 to users 16. For example, for each segment, the respective set of rules may specify which content 15 should be delivered at what time. Alternatively, a manager user at content provider 14 can select predefined segments a priori.

Prediction generator 62 converts predictive models generated by model engine 32 into optimized rule sets, which are known as predictions. That is, prediction generator 62 may perform an optimization process that removes information about unsuccessful content combinations or treatments from content system 10 and/or communication management system 12, thus leaving only information for content combinations or treatments worthy of being used.

By removing such non-useful data, prediction generator 62 enhances the resultant real time processing speed. For any given model operated upon by prediction generator 62, the conversion to a rule set is done to map the model back to terms understandable by the content system. It is possible to accept in this process separate models for various sub-populations of users 16 and/or include characteristics of individual users that drive differences in their behavior in the models.

As such, the techniques and functionality of prediction generator 62 allow inclusion and analysis of many individual characteristics of users 16, as well as different ways in which the characteristics can combine to drive differences in behaviors. For example, the time of day may be associated with differences in the propensity of various users 16 to click-through a website, all other factors being the same. Furthermore, the time of day may be associated with differences in the sensitivity of users to attributes like offer price or position on page.

Prediction generator 62 may receive input from a manager user, for example, to specify particular segments for investigation and optimization of content delivery. Through content provider interface 38, a manager user may specify identification rules based on data, fields, and values available in the observation module 36 or from the content provider's own customers (users) or site databases.

Prediction data store 66 is in communication with prediction generator 62. Prediction data store 66 generally functions to store and maintain prediction data 68. Prediction data 68 can be any information and data for creating, describing, defining, and implementing the predictions described herein. For each prediction, prediction data 68 can specify, for example, an identifier for the prediction, a set of rules for the prediction, definitions describing classes of users 16, and the content 15 which is best for each class.

Prediction data store 66 may be implemented in any one or more suitable storage media, such as random access memory (RAM), disk storage, or other suitable volatile and/or non-volatile storage medium. In one embodiment, prediction data storage 66 may comprise a relational database.

Prediction output object 64 is in communication with prediction data store 66 and data view reader 48 (of model engine 32). Prediction output object 64 may output the various prediction rules to the content system 10 for application during delivery of content 15 to users 16. In one embodiment, prediction output object 64 may be implemented or comprise a set of interface objects which can be delivered between various components or modules of communication management system 12 and content system 10.

In some applications which involve extensive content or large amounts of user data, the size of the set of prediction rules may be larger than practicable for review by a human user (e.g., manager user). To allow for practicable human review, prediction engine 34 may incorporate or include one or more rules-reduction algorithms for generating a reduced ruleset. Thus, when desired, a manager user may interact with prediction engine 34 to request a reduced ruleset.

In one exemplary implementation for a rules-reduction process, users 16 are searched and clustered together according to similarities or differences in their characteristics and optimal content. These clustered groups function as segments for implementing predictions. In another exemplary implementation for a rules-reduction process, segments are simultaneously searched during the modeling process. In yet another exemplary implementation, cost functions are used to constrain the model to produce a reasonably small number of distinct prediction rules.

Observation Module

Figure 6:
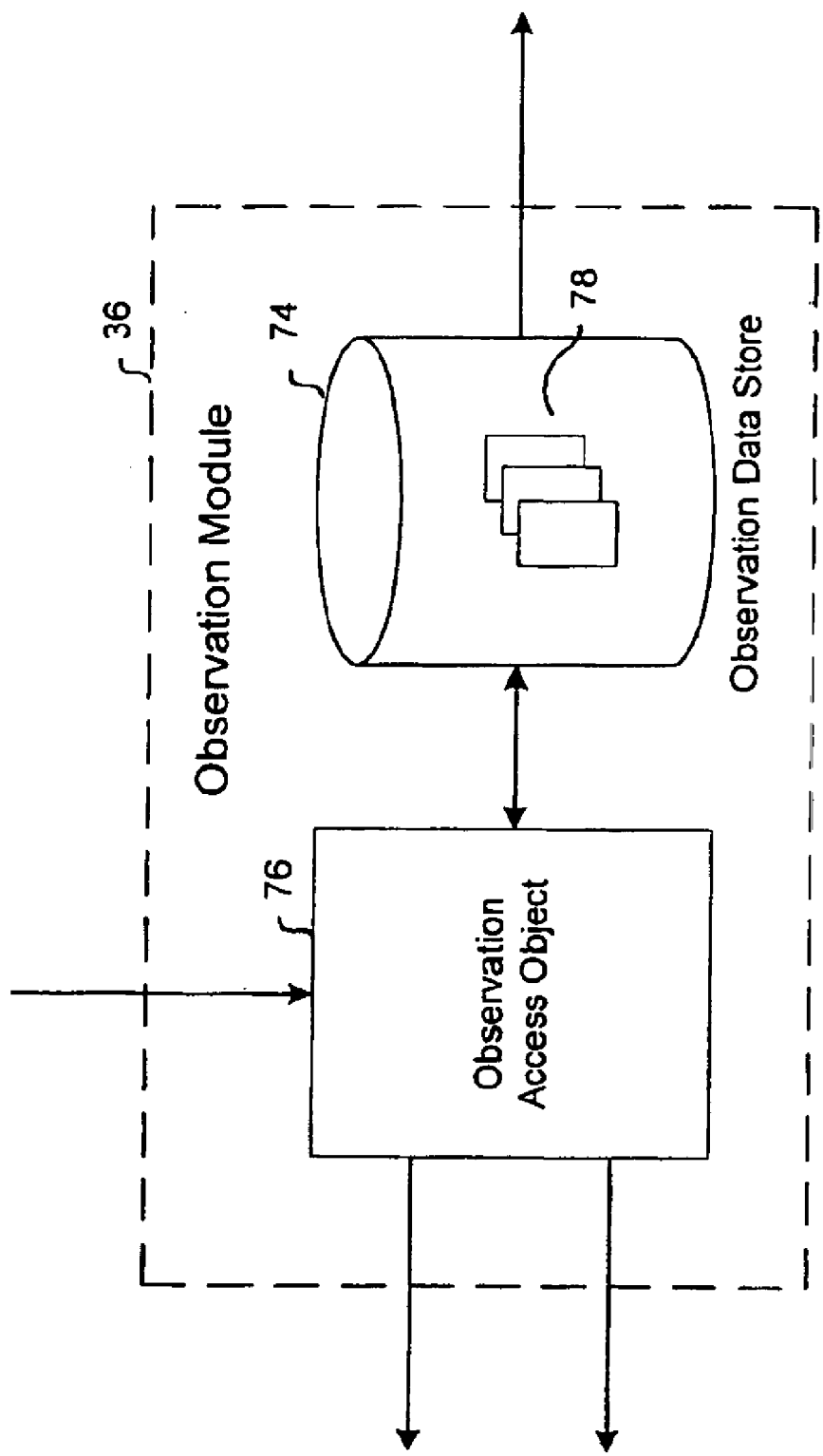
FIG. 6 is a block diagram for an observation module, according to an embodiment of the present invention.

FIG. 6 is a block diagram of an observation module 36, according to an embodiment of the present invention. As depicted, observation module 36 comprises an observation data store 74 and an observation access object 76.

Observation data store 74 generally functions to maintain or store observation data 78. Observation data 78 can be data or information relating to the observed behavior of users 16 which visit the website of content provider 14. Observation data 78 may thus specify, for example, the users 16 which visit the website, an Internet Protocol (IP) address for each user, the experimental conditions under which content 15 is delivered to each user, the observed outcomes or results of each visit, one or more experiment variables, one or more predictive covariates, one or more dependant variables, time stamps for each visit, and other useful data which can be used during analysis. At least a portion of observation data 78 may constitute raw information and basic statistics for observations. Observation data 78 may be maintained as structures which are appropriate for viewing and modeling the results by user (e.g., visitor), treatment, session, and user profile. Observation data 78 may allow communication management system 12 and content system 10 to deliver the same treatment to a user 16 who returns to the website (e.g., assuming such user returns from an identical IP address). Observation data store 74 may supply observation data 78 to a manager user via content provider interface 32.

Observation access object 76 is in communication with observation data store 74. Observation access object 76 generally functions to provide access to (storage or retrieval of) the observation data 78. Observation access object 76 may transfer observation data 78 to the model engine 32 in a form that is directly appropriate for modeling. The transfer process may involve checking the observation data 78 for data "pathologies" (e.g., missing data, structural dependencies, etc.) and transforming the data to model ready form (e.g., categorization and effects coding). In one embodiment, observation access object 76 may be implemented or comprise a set of interface objects which can be delivered between various components or modules of communication management system 12 and content system 10.

In some instances, content provider 14 may store user information in separate databases which may be combined with other data in observation data store 74. For example, an on-line banking application supported by a content provider 14 may draw data from a user's Internet session as well as from a financial institution's corporate database. In such case, observation access object 76 would link the corporate database to observation data store 74.

Scripting/Scheduling Engine

Figure 7:
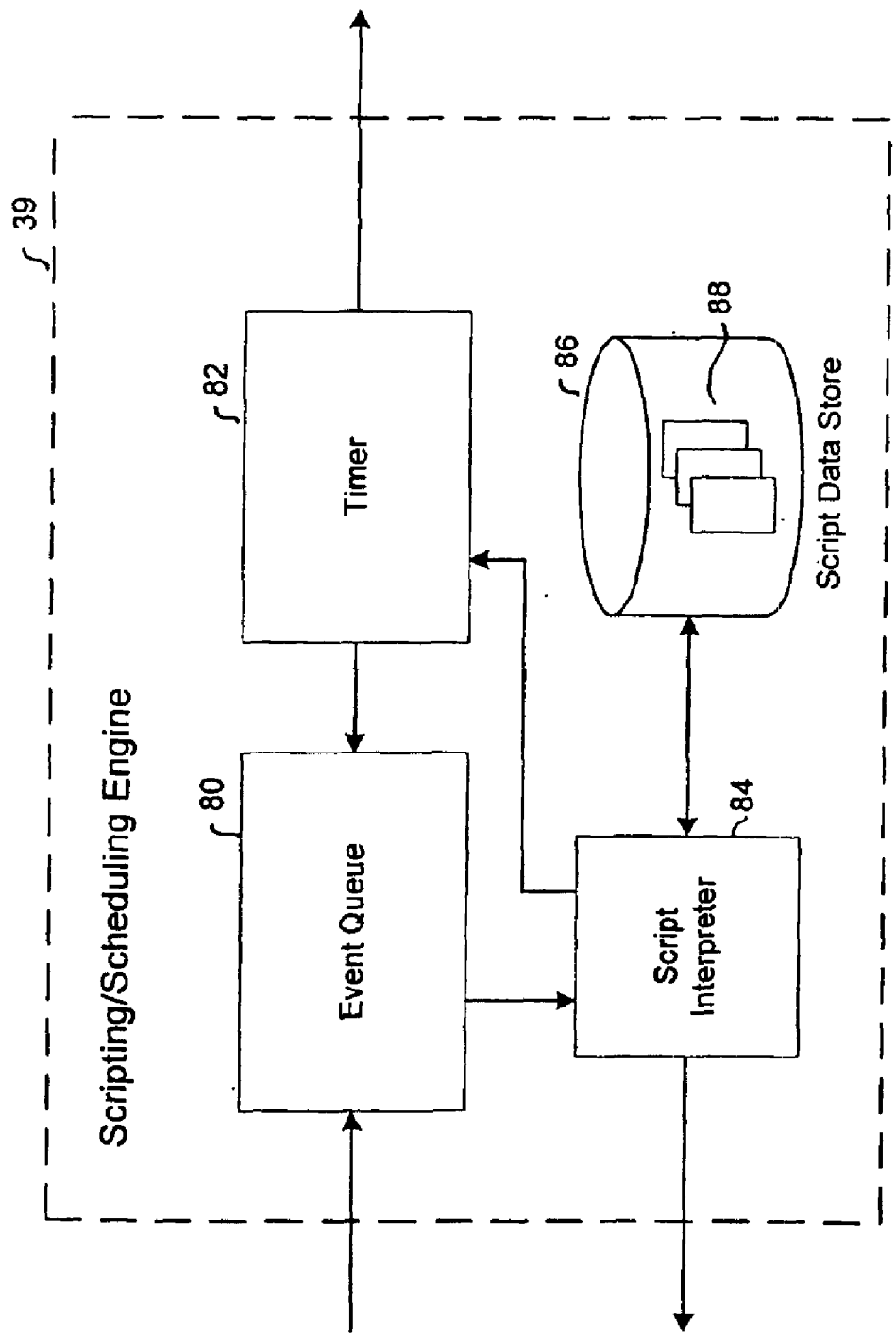
FIG. 7 is a block diagram of a scripting/scheduling engine, according to an embodiment of the present invention.

FIG. 7 is a block diagram of a scripting/scheduling engine 39, according to an embodiment of the present invention. As previously described, scripting/scheduling engine 39 generally functions to coordinate and automate the operation of the other elements in communication management system 12 and content system 10. As depicted, scripting/scheduling engine 39 comprises an event queue 80, a timer 82, a script interpreter 84, and a script data store 86.

Script interpreter 84 generally functions to run the various scripts which provide instructions or directions to other engines and modules in communication management system 12 and content system 10 (e.g., allocator module 22, experiment engine 30, model engine 32, prediction engine 34, or observation module 36). These scripts may initiate or cause some action to be taken in communication management system 12 or content system 10 in response to various events. Each script may specify a sequence or series of instructions which are issued to other engines and modules in systems 10 and 12 in order to coordinate the operation of the same.

An event can be, for example, the completion of some task by one of the various modules or engines in communication management system 12 or content system 10. Notification of each such event may be conveyed by the relevant module or engine to scripting/scheduling engine 39. An event may also relate to the occurrence of a predetermined time (e.g., 8:00 a.m.) or the lapse of a predetermined amount of time (e.g., two hours). Timer 82 keeps track of time and generates information for each event which is time-related.

Event queue 80, which is in communication with script interpreter 84, receives and stores information for each event of which scripting/scheduling engine 39 is notified or which is generated internally. Event queue 80 implements a queue for handling one or move events. These events can be specified in various scripts and may serve to trigger the issuance of instructions by script interpreter 84. In other words, for each event, script interpreter 84 may initiate or cause some action to be taken in communication management system 12 or content system 10 according to the particular script.

For example, an event can be the completion of an experiment by experiment engine 30, in which case, script interpreter 84 may desirably initiate the generation of a respective model using the results of experimentation. Thus, using the data produced by the various modules and engines, along with diagnostic information, script interpreter 84 may determine whether or not the modules or engines have completed their respective tasks successfully and initiate appropriate action by issuing respective instructions.

Script data store 86, which is in communication with script interpreter 84, generally functions to maintain or store script data 88. Script data 88 can be data or information relating to the various scripts generated and run by script interpreter 84. For each script, script data 88 may thus specify, for example, an identifier for the script, the instructions which are part of the script, the sequence in which the instructions should be issued, the events which should trigger the issuance of instructions, the modules or engines to which instructions should be issued, etc.

Method for Managing Content

Figure 8:
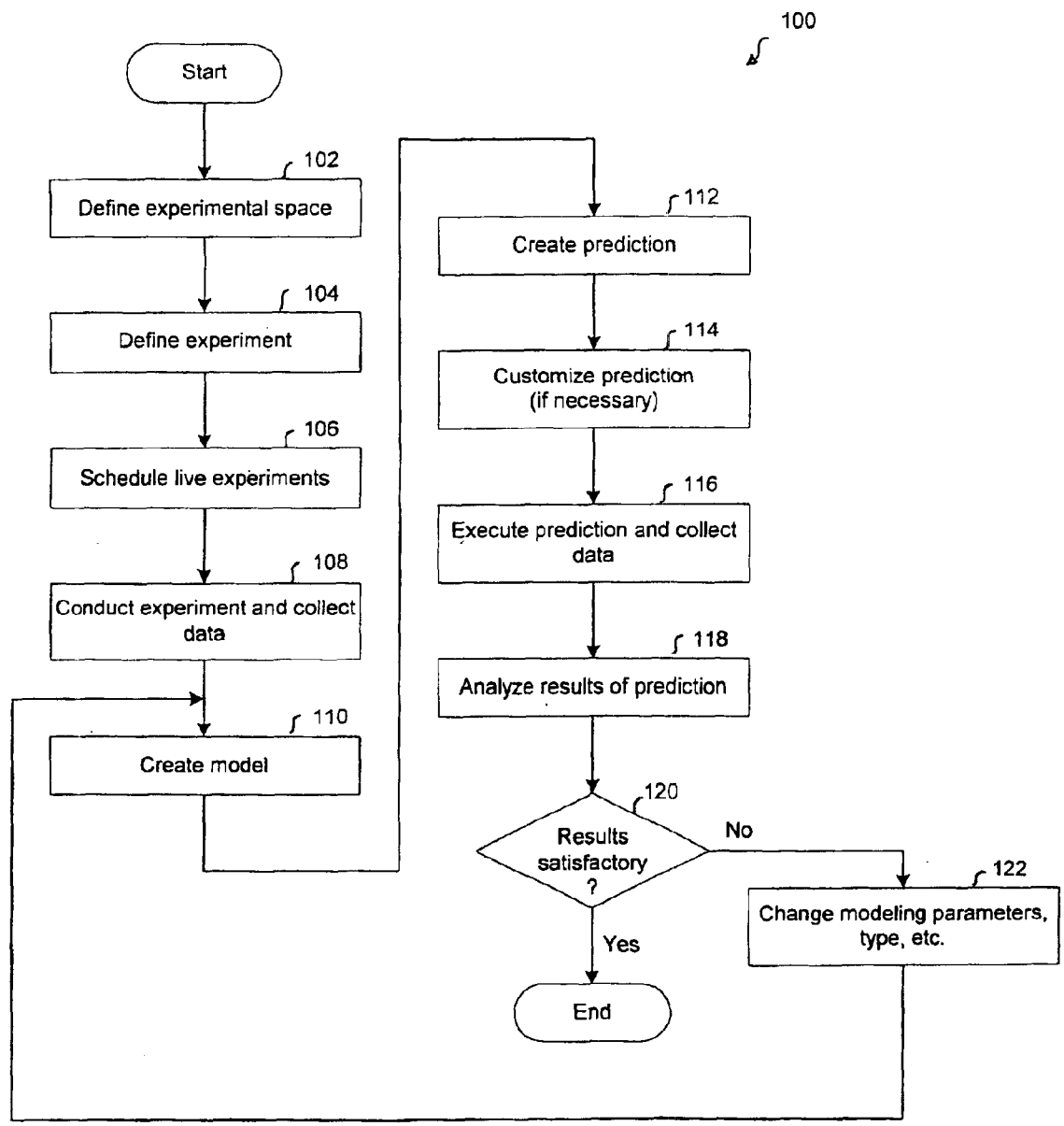
FIG. 8 is a flowchart of an exemplary method for managing content delivered to users, according to an embodiment of the present invention.

FIG. 8 is an exemplary method 100 for managing the content delivered to users, according to an embodiment of the present invention. Method 100 may correspond to various aspects of the operation of communication management system 12 cooperating with content system 10.

Method 100 begins at steps 102 and 104 where communication management system 12, cooperating with content system 10, defines an experimental space and an experiment. In one embodiment, experiment engine 30 may generate various definitions for the experiments and corresponding experimental space. These definitions may specify a particular set of content 15 which will be the subject of the experiments, one or more treatments into which the content 15 is arranged, the time period over which each experiment will be conducted, the control groups of users 16 to whom treatments will be delivered, the experiment rules which govern delivery of content treatments, the behavior of users 16 that should be monitored, the objectives/outcomes that are desirably achieved, etc. In one embodiment, a manager user at content provider 14 may interact with communication management system 12 to design the experiments.

At step 106, experiment engine 30 schedules live experiments for delivering particular treatments to respective control groups of users 16. At step 108, experiment engine 30, working in conjunction with allocator module 22, conducts the defined experiments and collects data relating to the observed behavior of users. In one embodiment, allocator module 22 may apply the experiment rules for delivering the various treatments to specific control groups. This may be done in response to user requests for content 15. Allocator module 32 may store details regarding the observed behavior of users, as related to the objectives to be optimized or otherwise, in observation module 36.

At step 110, model engine 32 creates a model using the collected data/information for observed behavior. The model may reflect the degree to which the content elements influence the behavior or choices of users 16. In particular, the behavioral model may comprise a sophisticated, continuous, and discrete multivariate statistical model which can be used to determine what aspects of a content structure or treatment influences the probability of achieving a particular outcome.

At step 112, prediction engine 34 creates or generates a prediction. This prediction can be a simple description of a model which is used to deliver content 15 to users 16 in a way which is most effective to achieve the desired outcomes/objectives. The prediction can be implemented in part with a set of prediction rules, which target specific content to particular kinds of users. At step 114, communication management system 12 allows a manager user at content provider 14 to customize the prediction if desired.

At step 116, communication management system 12 cooperates with content system 10 to execute the prediction and collect data. In particular, allocator module 22 may apply the prediction rules to deliver content 15 in response to requests by users 16. This results in the delivery of particular treatments to various users 16 depending on certain criteria (e.g., time of day, click trail, etc.). Data relating to the behavior of users 16 to the respective treatments is collected. At step 118, model engine 32 and prediction engine 34 may cooperate to analyze the results of the delivery of treatments during the prediction phase.

At step 120, communication management system 12 determines whether the observed results are satisfactory. That is, communication management system 12 determines whether users 16 have reacted in the desired manner to the content treatments which were delivered, thus achieving the desired outcomes or objectives. If the observed results are not satisfactory, then at step 122 model engine 32 changes the modeling parameters, type, etc., after which method 100 returns to step 110 where a new model is created. Method 100 repeats steps 110 through 122 until it is determined at step 120 that the results of prediction are satisfactory. At that point, method 100 ends.

Method For Defining an Experiment

Figure 9:
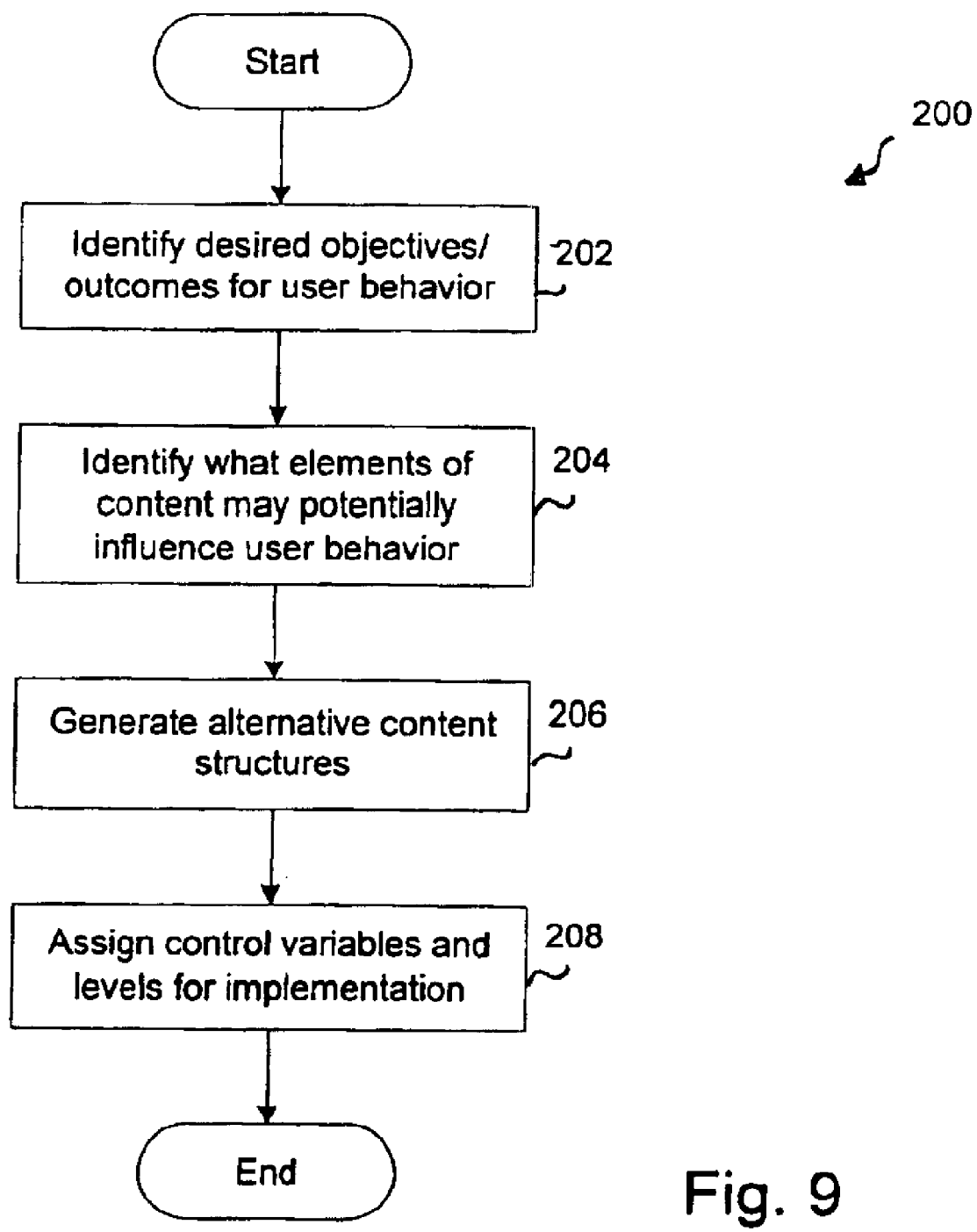
FIG. 9 is a flowchart of an exemplary method for defining an experiment for structured content, according to an embodiment of the present invention.

FIG. 9 is a flowchart of an exemplary method 200 for defining an experiment for structured content, according to an embodiment of the present invention. Method 200 may correspond to various aspects of operation of experiment engine 30 of communication management system 12.

Method 200 may be performed for each experiment carried out by communication management system 12 cooperating with content system 10. Each experiment may focus or concentrate on a particular set of content 15 which can be stored in content system 10. Any set of content 15 can include, for example, written text, images, graphics, animation, video, music, voice, and the like. Elemental components of content can be a text file, an image file, an audio file, a video file, etc.

Method 200 begins at step 202 where, for the present experiment, experiment engine 30 identifies the desired objectives/outcomes for user behavior. Such outcomes or objectives can be, for example, increasing sales and profits, improving electronic marketing effectiveness, and powering specific business intelligence applications. In one embodiment, the desired objectives/outcomes can be identified or selected by a manager user of content provider 14, via content provider interface 38. At step 204, experiment engine 30 identifies which element components of the particular set of content 15 may potentially influence user behavior related to the desired objectives/outcomes. This can be part of a designed experiment.

At step 206, experiment engine 30 generates a number of alternative content structures or treatments using various combinations of the elemental components. Each content structure or treatment can be, for example, a particular implementation of a web page. These alternative content structures may vary in the elemental components for one or more experiment variables under the control of communication management system 12. These variables can be, for example, background color, screen placement, size of content, etc. Different values or levels may be available for each variable. For example, for a variable of background color, different levels can be red, blue, gray, and black. For a variable of screen placement, different levels can be top center, right bottom, lower left, etc. The various treatments may be alternately delivered in response to the same request for content, as described herein.

At step 208, experiment engine 30 assigns control variables and levels for implementation of the experiments. This yields a number of alternate content structures or treatments for the particular set of content 15 of the present experiment. For example, in one treatment, a banner advertisement may have a background color of yellow and be placed in the top right corner of a screen, whereas in another treatment, a banner advertisement may have a background color of blue and be placed in the middle left portion of a screen. These alternate treatments for content 15 may be delivered to users 16 during experimentation. Afterwards, method 200 ends.

Method For Conducting an Experiment and Collecting Data

Figure 10:
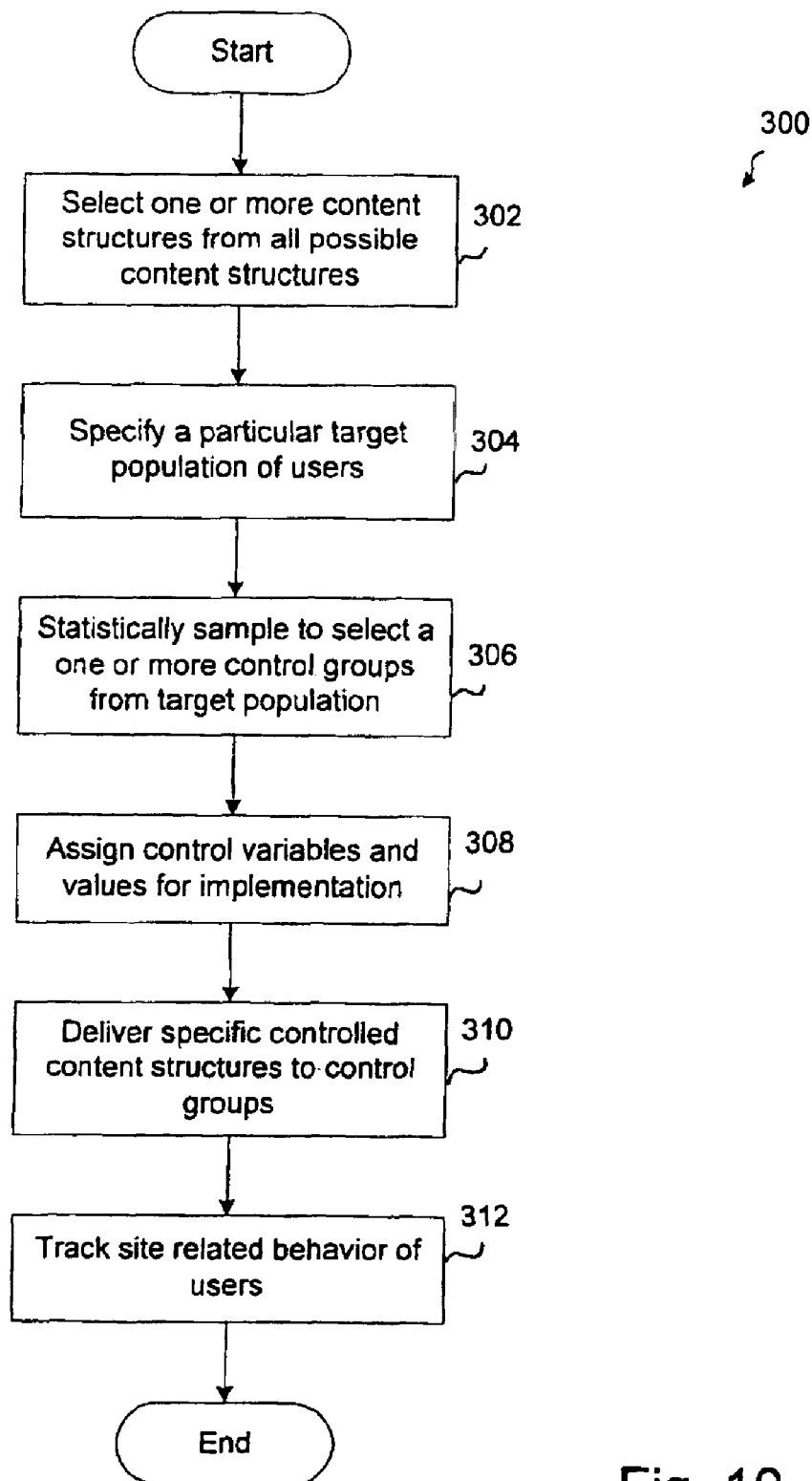
FIG. 10 is a flowchart of an exemplary method for conducting an experiment and collecting data for trackable outcomes/objectives, according to an embodiment of the present invention.

FIG. 10 is a flowchart of an exemplary method 300 for conducting an experiment and collecting data for trackable outcomes/objectives, according to an embodiment of the present invention. Method 300 may correspond to various aspects of operation of communication management system 12 cooperating with content system 10.

Method 300 begins at step 302 where experiment engine 30 and scripting/scheduling engine 39 select one or more content structures or treatments for delivery to users 16 during the present experiment. Each treatment can be a particular format for content 15 to be presented on a web page. For example, one treatment for the content of a web page can include a blue background on which photographs of each article are displayed from top to bottom on the left side of the screen, with accompanying descriptions provided on the right side next to each photograph. Another treatment for the content can include a red background on which photographs of each article are displayed from left to right on the top of the screen, with the accompanying descriptions provided beneath each photograph at the bottom of the screen.

These treatments may be alternately delivered in response to the same request for content. An exemplary request can be a request for a web page displaying a particular line of products (e.g., several articles of clothing). Such web page request can specify a particular identifier for the web page, such as, for example, a uniform resource locator (URL). Furthermore, the web page request can be related to a user's action of clicking on a particular hyperlink on a web page.

At step 304, communication management system 12 specifies a particular target population or segment of users 16 to receive the selected treatments. In one embodiment, a manager user may explicitly specify a particular target population of site users. For example, a target population can be those users who access a particular web page between the hours of 4:00 p.m. and 10:00 p.m. on weekdays. At step 306, allocator module 22 statistically samples to select one or more control groups of users 16 from a target population. For example, in one embodiment, statistical sampling procedures are used to select from all site visitors a profile-matched, random sample who will receive the control treatments as described herein. Each control group may comprise one or more users 16 who request content from content provider 12. Each control group may receive a different treatment during experimentation in response to identical requests for content. At step 308, communication management system 12 assigns control variables and values/levels for implementation, thereby specifying which treatment will be delivered to each control group.

At step 310, allocator module 22, via user interface 26, allocates or delivers the respective treatment to each control group. Various users 16 making identical requests to the website of content provider 14 (e.g., by specifying the same URL or clicking on the same hyperlink) may be delivered different treatments during the experimentation. With reference to the example described above, a first control group requesting information about the line of clothing may receive the treatment with a blue background and vertically positioned photographs, while a second control group requesting the same information may receive the treatment with a red background and horizontally positioned photographs. Allocator module 22 may store or record information on the control treatments and delivery to respective control groups in observation module 36.

At step 312, communication management system 12, cooperating with content system 10, tracks the site-related behavior of users 16 receiving the various treatments. This behavior can be an indicator for how favorably or unfavorably the users viewed the different treatments. Continuing with the immediate example, forty percent of the users in the first control group may actually purchase an item of clothing when presented with the treatment comprising a blue background and vertically aligned photographs, while only fifteen percent of the users in the second control group may actually purchase an item of clothing when presented with the treatment comprising a red background and horizontally aligned photographs. Communication management system 12 records information and data relating to such user behavior. This information or data can include dependent variable information, which is associated with the desired objectives/outcomes. All of this information may be stored into observation module 36 as observation data 78.

In one embodiment, user behavior can be categorized into various states. These states can be, for example, a decision to purchase a good, a decision not to purchase a good, a decision to remain at a particular web page, a decision to move to another web page, etc. Across the different control groups, communication management system 12 may record each change of state of user behavior for the various treatments to identify how differences in treatment influence the changes in state. Method 300 may then end.

Method For Modeling and Predicting

Figure 11:
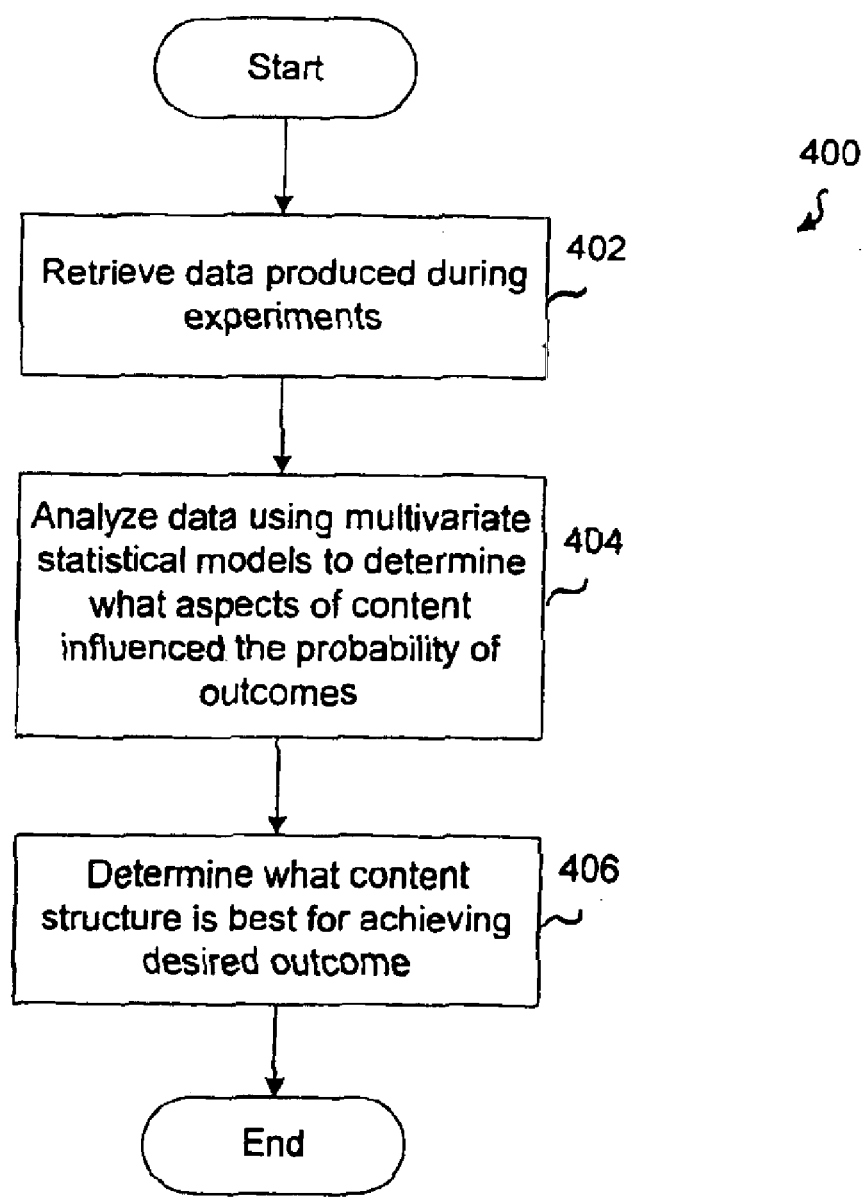
FIG. 11 is a flowchart of an exemplary method for modeling and predicting, according to an embodiment of the present invention.

FIG. 11 is an exemplary method 400 for modeling and predicting, according to an embodiment of the present invention. Method 400 may correspond to various aspects of operation of model engine 32 and prediction engine 34 of communication management system 12.

Method 400 begins at step 402 where model engine 32 retrieves, from observation module 36, observation data produced during the experiments conducted in part by experiment engine 30. This observation data includes data or information relating to the observed behavior of users 16 which visit the website of content provider 14. Among other things, the observation data may specify, for example, the users 16 which visit the website of content provider 14, the experimental conditions under which content 15 is delivered to each user, the observed outcomes or results of each visit, and one or more dependent variables related to the behavior observed during each visit.

At step 404, model engine 32 analyzes the observation data using multivariate statistical modeling techniques (e.g., Bayesian Markov Chain Monte Carlo estimation procedures) to determine what aspects (type and format) of content 15 influenced the probability of outcomes. To accomplish this, model engine 32 may analyze or consider the various dependent variables related to the behavior observed during experimentation. Model engine 32 may generate one or more predictive covariates.

At step 406, using the results of the analysis, model engine 32 in cooperation with prediction engine 34 determines what content structure or treatment is best for achieving some desired outcome or objective. In particular, model engine 32 and prediction engine 34 generate a prediction, for example, for how various users 16 may react to particular content. This can be done by converting a model into a set of prediction rules. The prediction rules target content 15 to specific users 16 in order to achieve desired objectives/outcomes (e.g., sales of a product), thus optimizing the delivery of content 15. Method 400 then ends.

A system and method according to embodiments of the present invention use experimental designs to systematically determine the relationships between content (type and format) and various desired outcomes/objectives. The experiments are carried out over the Internet or other suitable data network, thereby reaching a broad population of users to provide a more realistic, representative cross-section. Much of the work of the experimentation is automated, thus reducing the need for manual set-up and analysis.

Although particular embodiments of the present invention have been shown and described, it will be obvious to those skilled in the art that changes or modifications may be made without departing from the present invention in its broader aspects, and therefore, the appended claims are to encompass within their scope all such changes and modifications that fall within the true scope of the present invention.

What is claimed is:

1. An automated computer-implemented method comprising:

defining an experiment to gauge user reaction to various treatments for a set of content elements, conducting the experiment over a data network; and collecting over the data network observation data relating to user behavior for each treatment wherein conducting the experiment comprises:

statistically sampling to specify a plurality of control groups, each control group comprising at least one user;

specifying a particular treatment to be delivered to the at least one user in each control group;

receiving identical requests for content from the respective at least one user in each of the control groups; and in response to the identical requests, delivering to the at least one user in each control group a different treatment.

2. The method of claim 1 wherein defining an experiment comprises:

identifying desired objectives for user behavior; and identifying which treatments may influence user behavior related to the desired objectives.

3. The method of claim 2 further comprising:

defining at least one control variable for the various treatments; and assigning a respective level for the control variable for each treatment.

4. The method of claim 1 wherein conducting the experiment comprises:

selecting at least one treatment for delivery to users;

grouping users into a plurality of segments, each segment comprising users with similar behavioral characteristics; and specifying a particular segment of users to receive the selected treatment.

5. The method of claim 1 further comprising observing site-related behavior of users receiving the various treatments.

6. The method of claim 5 wherein collecting observation data comprises recording observed behavior in each control group during the experiment.

7. The method of claim 1 wherein the data network comprises the internet.

8. The method of claim 1 further comprising identifying elements of content which potentially influence behavior of users.

9. The method of claim 1 wherein the experiment is delivered over the data network to respective control groups of users according to the experiment and wherein the method further comprises generating a model for predicting anticipated behavior of users based upon the observed behavior; and generating a prediction for delivering one of the treatments to users according to the model in order to optimize a desired outcome.

10. The method of claim 9 wherein defining an experiment comprises identifying elements of content which potentially influence behavior of users.

11. An automated system comprising:

a content system operable to store content, the content comprising a set of content elements; and a communication management system in communication with the content system and operable to define an experiment relating to various treatments for the set of content elements, conduct the experiment over a data network, and collect over the data network observation data relating to user behavior for each treatment, wherein the system is configured for statistically sampling to specify a plurality of control groups, each control group comprising at least one user;

specifying a particular treatment to be delivered to the at least one user in each control group;

receiving identical requests for content from the respective at least one user in each of the control groups; and in response to the identical requests, delivering to the at least one user in each control group a different treatment.

12. The system of claim 11 wherein the communication management system is operable to identify content elements which may influence user behavior.

13. The system of claim 11 wherein the communication management system is operable to generate a set of experiment rules for allocating treatments during the experiment.

14. The system of claim 11 wherein the content system is operable to allocate treatments to users according to the experiment rules.

15. The system of claim 11 wherein the communication management system is operable to group users into a plurality of segments, each segment comprising users with similar behavioral characteristics.

16. The system of claim 11 wherein said data network comprises the internet.

17. The system of claim 11 wherein the communication management system is operable to define at least one control variable for the various treatments and to assign a respective level for the control variables for each treatment.

18. The system of claim 11 wherein the content system and the communication management system are connected to the data network.

19. The system of claim 11 wherein the content system comprises an allocator module operable to support an interface with the communication management system.

20. The system of claim 11 wherein the communication management system comprises an allocator interface object operable to support an interface with the content system.

21. The system of claim 11 further comprising a content provider interface operable to support an interface between the communication management system and a manager user.

22. The system of claim 11 wherein the communication management system is operable to generate a set of prediction rules for allocating treatments to users with specific behavioral characteristics.

23. The system of claim 22 wherein the content system is operable to allocate treatments to users according to the prediction rules.

24. The system of claim 11 wherein the communication management system implements a personalization process.

25. The system of claim 11 wherein the designed experiment reduces the number of combinations included in the experiment by measuring and estimating only those effects that are of a predetermined interest.

26. A computer-implemented method for on-line experimentation comprising:

defining a plurality of treatments for a set of content elements;

receiving requests for content from users over a data network;

statistically sampling to create at least one control group of users;

allocating over the data network a first treatment to each user in the control group;

allocating over the data network a second treatment to each user not in the control group; and collecting observation data for observed behavior of users in the control group and users not in the control group.

27. The method of claim 26 further comprising identifying elements of content which may influence user behavior.

28. The method of claim 26 wherein providing a website comprises providing a web page at which the set of content elements is available in the form of any of the treatments.

29. The method of claim 26 wherein the data network comprises the internet.

30. An online experimentation system configured to automatically create various treatments for a set of content elements according to systematic rules of experimentation that determine a number of alternative treatments using various combinations of the content elements from the set, and to allocate the treatments to users to test user behavior in response to the various treatments, the system being further configured to capture data relating to the observed behavior of users relative to the various treatments and to perform one or more methods comprising: (1) analyze the data to derive a model in form of a contingency table; (2) process the data for pathologies, including at least one of missing data, and structural dependencies, and processing the data to be model ready; (3) make inferences about some variables that influence user behavior based on random utility theory; and (4) modeling user behavior based on Bayesian Markov Chain Monte Carlo estimation procedure.

31. A machine readable medium including a set of instructions for:

defining an experiment to gauge user reaction to various treatments for a set of content elements;

conducting the experiment over a data network; and collecting over the data network observation data relating to user behavior for each treatment wherein conducting the experiment comprises:

statistically sampling to specify a plurality of control groups, each control group comprising at least one user;

specifying a particular treatment to be delivered to the at least one user in each control group;

receiving identical requests for content from the respective at least one user in each of the control groups; and in response to the identical requests, delivering to the at least one user in each control group a different treatment.

32. A content page comprising a set of content elements generated by a computer implemented system for:

defining an experiment to gauge user reaction to various treatments for a set of content elements;

conducting the experiment over a data network; and collecting over the data network observation data relating to user behavior for each treatment wherein conducting the experiment comprises:

statistically sampling to specify a plurality of control groups, each control group comprising at least one user;

specifying a particular treatment to be delivered to the at least one user in each control group;

receiving identical requests for content from the respective at least one user in each of the control groups; and in response to the identical requests, delivering to the at least one user in each control group a different treatment.

33. An automated system for experimentation, the system being configured to:

generate and allocate a set of treatments from a predefined set of control elements, according to experiment designs, the system capable of determining a design by selecting from design criteria comprising: the specific effects allowed; the number of factors and factor levels included; and the amount of information produced in relation to the objective outcome; and collect observation data of user behavior to the set of treatments and determine the effect of each control element on user behavior according to choice models, behavioral models, or contingency tables.

34. The system of claim 33 wherein the experiment engine is operable to implement statistical sampling procedures to deliver over the data network the various treatments to respective control groups of users.

35. The system of claim 33 wherein the data network comprises the internet.

36. The system of claim 33 wherein the system is further configured to determine and allocate a treatment from the set of content elements to increase the probability of achieving a desired objective based on the determination of the effects of the content elements.

37. A computer implemented method comprising:

automatically creating various treatments for a set of content elements according to systematic rules of experimentation that determine a number of alternative treatments using various combinations of the content elements from the set;

allocating the treatments to users to test user behavior in response to the various treatments;

capturing data relating to the observed behavior of users relative to the various treatments;

performing one or more of: (1) analyzing the data to derive a model in form of a contingency table; (2) processing the data for pathologies, including at least one of missing data, and structural dependencies, and processing the data to be model ready; (3) making inferences about some variables that influence user behavior based on random utility theory; and (4) modeling user behavior based on Bayesian Markov Chain Monte Carlo estimation procedure.

38. A computer implemented method, comprising:

generating and allocating a set of treatments from a predefined set of content elements, according to experiment designs, the system capable of determining a design by selecting from design criteria comprising: the specific effects allowed; the number of factors and factor levels included; and the amount of information produced in relation to the objective outcome; and collecting observation data of user behavior for the set of treatments and determining the effect of each content element on user behavior according to choice models, behavioral models, or contingency tables.

39. The method of claim 38 further comprising determining and allocating a treatment from the set of content elements to increase the probability of achieving a desired objective based on the determination of the effects of the content elements.

40. A machine readable medium storing a set of instructions for performing the steps comprising:

automatically creating various treatments for a set of content elements according to systematic rules of experimentation that determine a number of alternative treatments using various combinations of the content elements from the set;

allocating the treatments to users to test user behavior in response to the various treatments capturing data relating to the observed behavior of users relative to the various treatments;

performing one or more of: (1) analyzing the data to derive a model in form of a contingency table; (2) processing the data for pathologies, including at least one of missing data, and structural dependencies, and processing the data to be model ready; (3) making inferences about some variables that influence user behavior based on random utility theory; and (4) modeling user behavior based on Bayesian Markov Chain Monte Carlo estimation procedure.

41. A machine readable medium storing a set of instructions for performing the steps comprising:

generating and allocating a set of treatments from a predefined set of content elements, according to experiment designs, the system capable of determining a design by selecting from design criteria comprising: the specific effects allowed; the number of factors and factor levels included; and the amount of information produced in relation to the objective outcome; and collecting observation data of user behavior for the set of treatments and determining the effect of each content element on user behavior according to choice models, behavioral models, or contingency tables.

42. The machine readable medium of claim 41 further comprising instructions for determining and allocating a treatment from the set of content elements to increase the probability of achieving a desired objective based on the determination of the effects of the content elements.

43. A computer implemented method, comprising:

defining an experiment to gauge user reaction to various treatments for a set of content elements;

conducting the experiment over a data network; and collecting over the data network observation data relating to user behavior for each treatment wherein conducting the experiment comprises:

statistically sampling to specify a plurality of control groups, each control group comprising at least one user;

specifying a particular treatment to be delivered to the at least one user in each control group;

receiving identical requests for content from the respective at least one user in each of the control groups; and in response to the identical requests, delivering to the at least one user in each control group a different treatment.

* * * * *